United States Patent
Glendenning et al.

(10) Patent No.: US 7,938,075 B1
(45) Date of Patent: May 10, 2011

(54) AUTOMATED SEED DETECTION AND PLANTING SYNCHRONIZATION APPARATUS, METHOD AND SYSTEM

(75) Inventors: Matthew K. Glendenning, Eltopia, WA (US); Daniel M. Goldman, Des Moines, IA (US); David E. Johnson, Grimes, IA (US); Jason J. Kelsick, Alleman, IA (US); David C. Smith, Ankeny, IA (US)

(73) Assignee: Pioneer Hi-Bred International, Inc., Johnston, IA (US)

( * ) Notice: Subject to any disclaimer, the term of this patent is extended or adjusted under 35 U.S.C. 154(b) by 0 days.

(21) Appl. No.: 12/607,372

(22) Filed: Oct. 28, 2009

(51) Int. Cl.
*A01C 7/10* (2006.01)
*G05B 19/042* (2006.01)

(52) U.S. Cl. ......... 111/200; 111/185; 111/900; 111/903

(58) Field of Classification Search .................. 111/104, 111/200, 900, 903, 170, 177, 183–185
See application file for complete search history.

(56) References Cited

U.S. PATENT DOCUMENTS

| | | | |
|---|---|---|---|
| 4,225,930 A | 9/1980 | Steffen | |
| 4,255,930 A | 3/1981 | Natalie | |
| 5,325,801 A | 7/1994 | Fiorido | |
| 5,501,336 A | 3/1996 | De Maria | |
| 5,501,366 A | 3/1996 | Fiorido | |
| 6,070,539 A | 6/2000 | Flamme et al. | |
| 6,091,997 A | 7/2000 | Flamme et al. | |
| 6,109,193 A | 8/2000 | Crabb et al. | |
| 6,193,175 B1 | 2/2001 | Andersson et al. | |
| 6,581,533 B1 | 6/2003 | Hagen et al. | |
| 6,615,754 B2 | 9/2003 | Unruh et al. | |
| 6,647,904 B1 | 11/2003 | Mariman et al. | |
| 7,017,502 B2 | 3/2006 | Quam et al. | |
| 2004/0231575 A1 | 11/2004 | Wilkerson et al. | |
| 2007/0266917 A1 | 11/2007 | Riewerts et al. | |
| 2009/0000533 A1 | 1/2009 | Wendte | |

FOREIGN PATENT DOCUMENTS

| | | |
|---|---|---|
| EP | 2031955 | 3/2009 |
| WO | WO 2007/136606 | 11/2007 |

OTHER PUBLICATIONS

International Search Report and Written Opinion for corresponding International Application No. PCT/US2090/062350 mailed Jul. 2, 2010.
Mater-Macc; Magicsem Seed Distributor; © 2009 MATERMACC S.P.A.; Italy; located at website: http://www.matermacc.it/eng/magicsem_stampa.html on May 22, 2010; 1 sheet.

*Primary Examiner* — Christopher J. Novosad
(74) *Attorney, Agent, or Firm* — Alston & Bird LLP

(57) ABSTRACT

An automated seed detection and planting synchronization apparatus, method and system is disclosed. The invention includes a seed detection protocol configured to monitor a derived metric equated to timing of movement of a seed carried by a seed metering unit from a seed pick-up to seed drop point. For controlling synchronization of planting of seed, a seed metering unit empty notification signal is provided if the derived metric is satisfied and sensor readings confirm the absence of seed in the seed metering unit.

36 Claims, 11 Drawing Sheets

AUTOMATED SEED DETECTION AND PLANTING SYNCHRONIZATION APPARATUS, METHOD AND SYSTEM

FIELD OF THE INVENTION

The present invention relates to an automated seed detection and planting synchronization apparatus, method and system, and particularly to an automated seed detection and planting synchronization apparatus, method and system for use with a seed planter adapted for detecting when a seed metering unit is empty of seed.

BACKGROUND

Previously, to verify if all seed had been fully dispensed from a seed metering unit, the seed hopper was visually monitored or inspected. If the metering unit was believed to be empty, new seed or another seed batch was introduced and planting continued. Visual inspection sometimes requires stoppage of planting and thus results in delays and extended gaps between plots as the planter continues through the field. Further, visual or rushed manual inspection to verify if a metering unit is empty is not without error. In the case where different seed batch types are being planted, it is utterly important that the metering unit be confirmed as being empty of all seed before the next seed batch is planted to avoid carryover and contamination of the seed plot.

Therefore, a need has been identified in the art to provide an automated seed detection and planting synchronization apparatus, method and system for detecting when the seed metering unit is empty to prevent carryover and/or contamination of a seed plot.

Ascertaining whether a seed metering unit is empty by monitoring or inspecting the seed metering unit either manually or visually is subject to error. As such, actual and validated confirmation of the seed metering unit being totally empty of seed may not occur prior to the introduction of the next seed batch into the seed metering unit. If the seed metering unit is in fact not entirely empty, the premature introduction of seed into the seed metering unit creates a risk of seed carryover and/or contamination of a seed plot. Further, because the planter is continuously moving through the field during planting, gap control reliability between different seed batches may be mitigated as a result of undetected seed in the seed metering unit. For example, an undetected seed leftover in the seed metering unit may be planted during gap planting or with the next seed batch resulting in seed carryover and/or contamination of the seed plot.

Therefore, a further need has been identified in the art to provide an automated seed detection and planting synchronization apparatus, method and system adapted for detecting when the seed metering unit is empty for timing the introduction of the next seed batch into the seed metering unit for controlling the length of the gap between planted plots to further reduce carryover and/or contamination risks.

Automated systems for detecting the movement of seed in and out of a seed metering unit lack the ability to provide actual and validated confirmation that the seed metering unit is truly empty of any and all seed. Often, a subsequent planting action is taken based on the assumption, but not an actual validated (automated) confirmation, that the seed metering unit is empty.

Therefore, a still further need has been identified in the art to provide an automated seed detection and planting synchronization apparatus, method and system having an automated seed detection protocol for providing an actual and validated seed meter emptying notification signal, response or instruction when the seed metering unit is empty to allow an operator to rely on the notification without risking contamination and/or carryover of a seed batch or seed plot.

SUMMARY

According to one aspect of the present invention, an improved seed planter adapted for detecting when a seed metering unit is empty is disclosed. The planter includes a mobile structure having a seed staging, metering and planting unit. The seed metering unit includes seed metering means, a seed pick-up and drop point, and a sensor at the seed pick-up point for detecting even one single seed. A seed detection protocol is also provided that includes a derived metric equated to timing of movement of a seed carried by seed metering means from the seed pick-up to the seed drop point. A seed metering unit empty notification is provided if the derived metric is satisfied and sensor readings confirm the absence of seed in the seed metering unit.

According to another aspect of the present invention, a new method for a seed planter for preventing seed carryover during the planting of different seed batch types is disclosed. The method includes the steps of providing a seed planter having a seed staging, metering and planting unit. The seed metering unit includes seed metering means having a seed pick-up point and drop point. The seed drop point is in communication with the seed planting unit. The method also includes monitoring a derived metric equated to timing of movement of a seed carried from the seed pick-up point to the seed drop point, issuing a seed metering unit empty signal if the derived metric is satisfied and sensor readings confirm the absence of seed in the seed metering unit. Included also in the method is the step of moving a next seed batch from the seed staging unit to the seed metering unit upon receipt of the seed metering unit empty signal.

BRIEF DESCRIPTION OF THE DRAWINGS

While the specification concludes with claims particularly pointing out and distinctly claiming the invention, it is believed that the present invention will be better understood from the following description taken in conjunction with the accompanied drawings in which:

DETAILED DESCRIPTION

Figure 1:
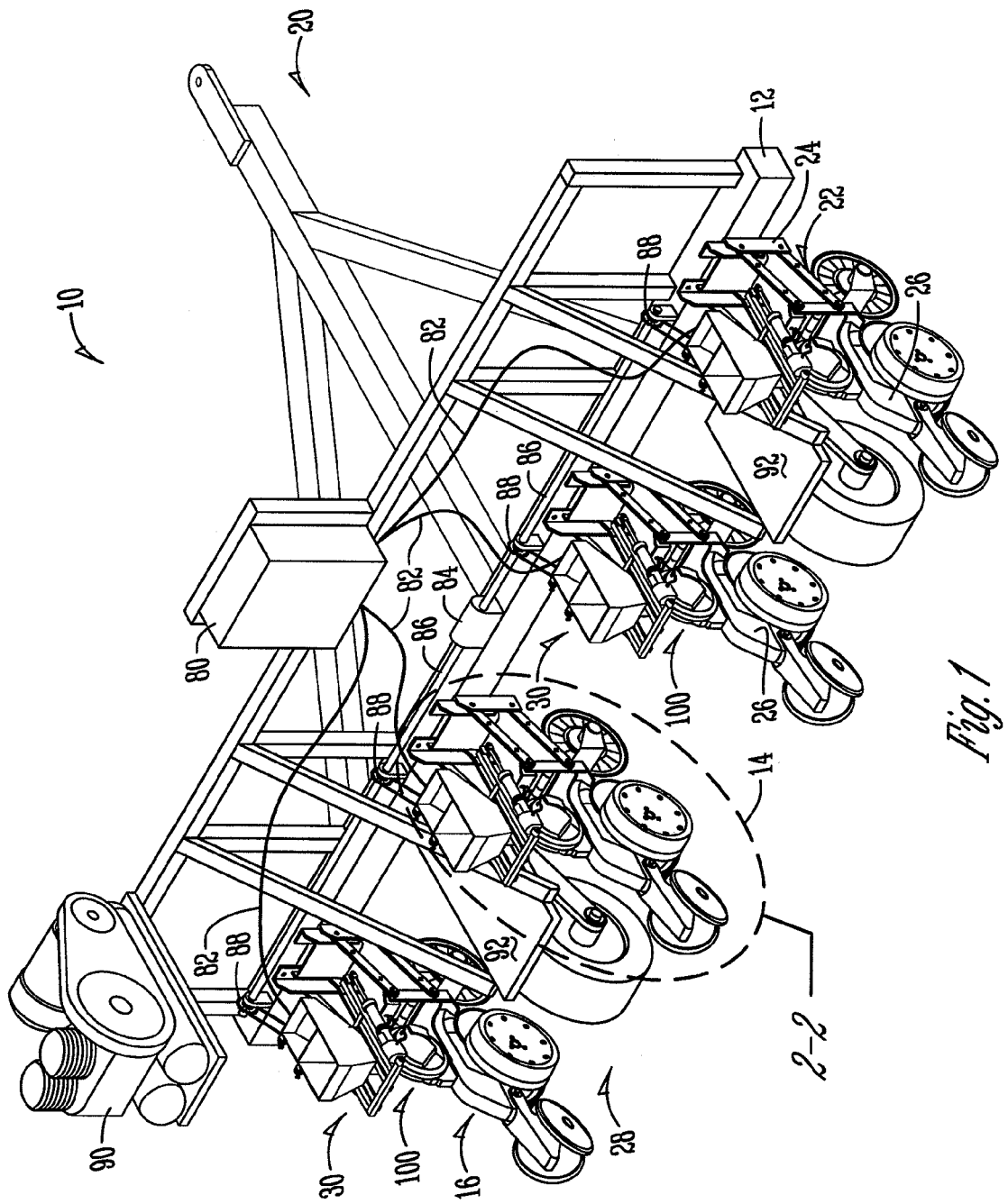
FIG. 1 is a perspective view of one embodiment of the present invention.

The following description is merely exemplary in nature and is not intended to limit the present disclosure, application or uses. For a better understanding of the invention, several exemplary embodiments will now be described in detail. Reference will be taken from time-to-time to the appended drawings. Reference numerals will be used to indicate certain parts and locations throughout the figures unless otherwise indicated.

Apparatus

An improved seed planter providing automated seed detection and planting synchronization for preventing carryover and contamination of a batch of seed or seed plot is shown generally in FIG. 1. For the purpose of this application, the term "plot" or "seed plot" is to be understood as the total plantings resulting from a single batch of seed. Therefore, multiple batches of planted seed would result in multiple seed plots.

In the case where aspects of the present invention are included in a seed planter, such as planter 10 illustrated in FIG. 1, a mobile structure 12 is provided as supporting structure for a plurality of row units 14. The present invention is not limited to use with seed planters, but has application wherever an empty verification is desired. For example, verifying whether or not a device or apparatus for metering materials is empty to know when the next material batch may be introduced into the material meter to avoid carryover or contamination of the batches being dispensed is of utmost importance across varied industries. The number of row units 14 supported by mobile structure 12 may be a number best suited for each particular application. Those skilled in the art can appreciate the requisite spacing and number of row units 14 needed for various planting applications.

Each row unit 14 includes generally some form of a floatation linkage assembly such as parallel linkage 22. Parallel linkage 22 is attached to a mounting plate 24 secured to mobile structure 12. A frame 26 supporting row unit 16 is attached to the parallel linkage 22 which is supported by mounting plate 24, as is customary in the art. Parallel linkage 22 allows row unit 14 to follow the terrain as the planter passes through the field. The planting unit 16 may be a commercial unit, such as a JOHN DEERE XP PRO row unit (see row units [online], [retrieved 2009 Jul. 21]. Retrieved from the Internet http://www.deere.com) or another brand of row unit which are known in the art. As is customary, the row unit 16 includes generally a frame 26 supported by parallel linkage 22. Rotatably attached to frame 26 is a plurality of various types of wheels including, such as, a coulter wheel, a furrow opener wheel, a depth gage wheel, and/or a closing wheel. Typically, a conduit, such as a seed tube, passes through the frame 26 from seed metering unit 100 whereby seed metered from seed metering unit 100 is passed through for planting in the field. Seed metering unit 100 is attached to frame 26 of planting unit 16. Supported atop seed metering unit 100 is a staging unit 30 adapted for staging seed to be introduced into seed metering unit 100. As is customary with a seed planter, such as seed planter 10, mobile structure 12 includes a hitch 20 for securing mobile structure 12 to a towing implement. Mobile structure 12 also includes one or more lift assist wheel assemblies 28 for raising and lowering the mobile structure 12 as needed. Lift assist wheel assemblies 28 are well known in the art. Mobile structure 12 can, in addition to being towed by some towing implement, be piloted by automation through the field by an autonomous navigational system.

Mobile structure 12 may also include a control panel 80 for housing one or more of the operating components of the seed planter 10. Control panel 80 may include one or more control wires 82 extending to each row unit 14 of seed planter 10. Operating instructions may be communicated through control wires 82 to individual row units 14 for operating various components associated with each row unit 14.

In one aspect, seed planter 10 includes a variable speed control 84 for controlling or defining the ratio between ground speed and speed of shafts 86. In one aspect of the invention, the variable speed control 84 could include a gear box. Shafts 86 extend from the variable speed control 84 outward toward each row unit 14. A sprocket 88 or other type of gear is mounted on shaft 86 adjacent each row unit 14. Rotation of shaft 86 imparts rotation to sprockets 88. Shaft 86 may be rotatably supported by one or more bearings attached to mobile structure 12. A chain or belt connects each sprocket 88 with each respective row unit 14. Rotation of the chain or belt is configured to impart rotation to seed disk 112 associated with each seed metering unit 100. Thus, in one aspect of the present invention, seed metering unit 100 is mechanically linked and driven by rotation of shaft 86. Rotation may be imparted to variable speed control 84 by rotation of a shaft resulting from movement of seed planter 10 through the field. An air compressor 90 may also be provided and operatively attached to mobile structure 12 so that various aspects of the seed planter 10, such as each row unit 14, may be operated pneumatically. For example, compressor 90 could be configured to communicate compressed air to operate each actuator 48 associated with each row unit 14. Compressor 90 could also be used to actuate lift assist wheel assemblies 28 for raising and lowering mobile structure 12 as needed.

Those skilled in the art can appreciate that various options exist for imparting rotation to seed metering unit 100 as seed planter 10 moves through the field. In the embodiment illustrated in FIG. 1, each seed disk 112 associated with each seed metering unit 100 is mechanically linked with rotation of shaft 86 tied into variable speed control 84. Variable speed control 84 may include one or more means for adjusting the gear ratio and the subsequent rotational velocity of shaft 86 based on forward movement and/or velocity of seed planter 10 through the field.

Mobile structure 12 may be configured with one or more operator pedestals 92 whereby one or more operators are able to stand adjacent each row unit 14 for monitoring and facilitating operation of each row unit 14. For example, operators may stand on operator pedestals 92 to introduce batches of seed into staging unit 30 as seed planter 10 passes through the field. Standing atop operator pedestals 92, operators are able to view light indicators 76 associated with staging units 30, which indicate to or instruct an operator to proceed with introducing another batch of seed into staging unit 30 and/or seed metering unit 100.

Figure 2:
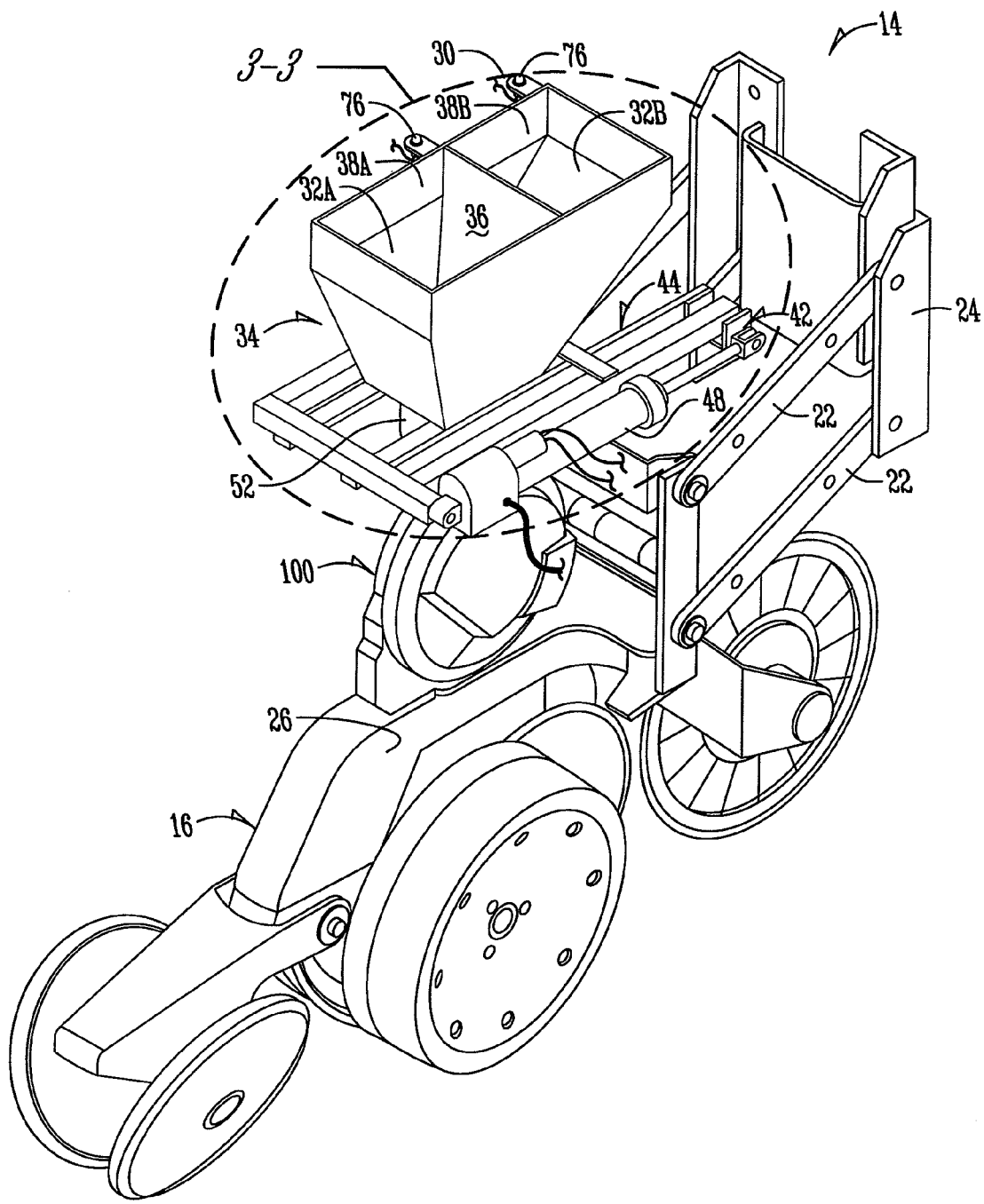
FIG. 2 is a perspective view taken along line 2-2 in FIG. 1 illustrating a row unit according to one aspect of the present invention.

As is best illustrated in FIG. 2, row unit 14 includes a staging unit 30 supported by attachment to either frame 26 or seed metering unit 100. Staging unit 30 is in seed delivering communication with seed metering unit 100, which in-turn is in seed delivering communication with seed planting unit 16. For example, and as is customary with a planting unit such as planting unit 16 illustrated in FIG. 2, as row unit 14 passes through the field, seed metered from the seed metering unit 100 is planted in the field using one or more of the wheels rotatably supported by frame 26, such as a coulter wheel, a furrow opener wheel, a depth gage wheel and/or a closing wheel.

Figure 3A:
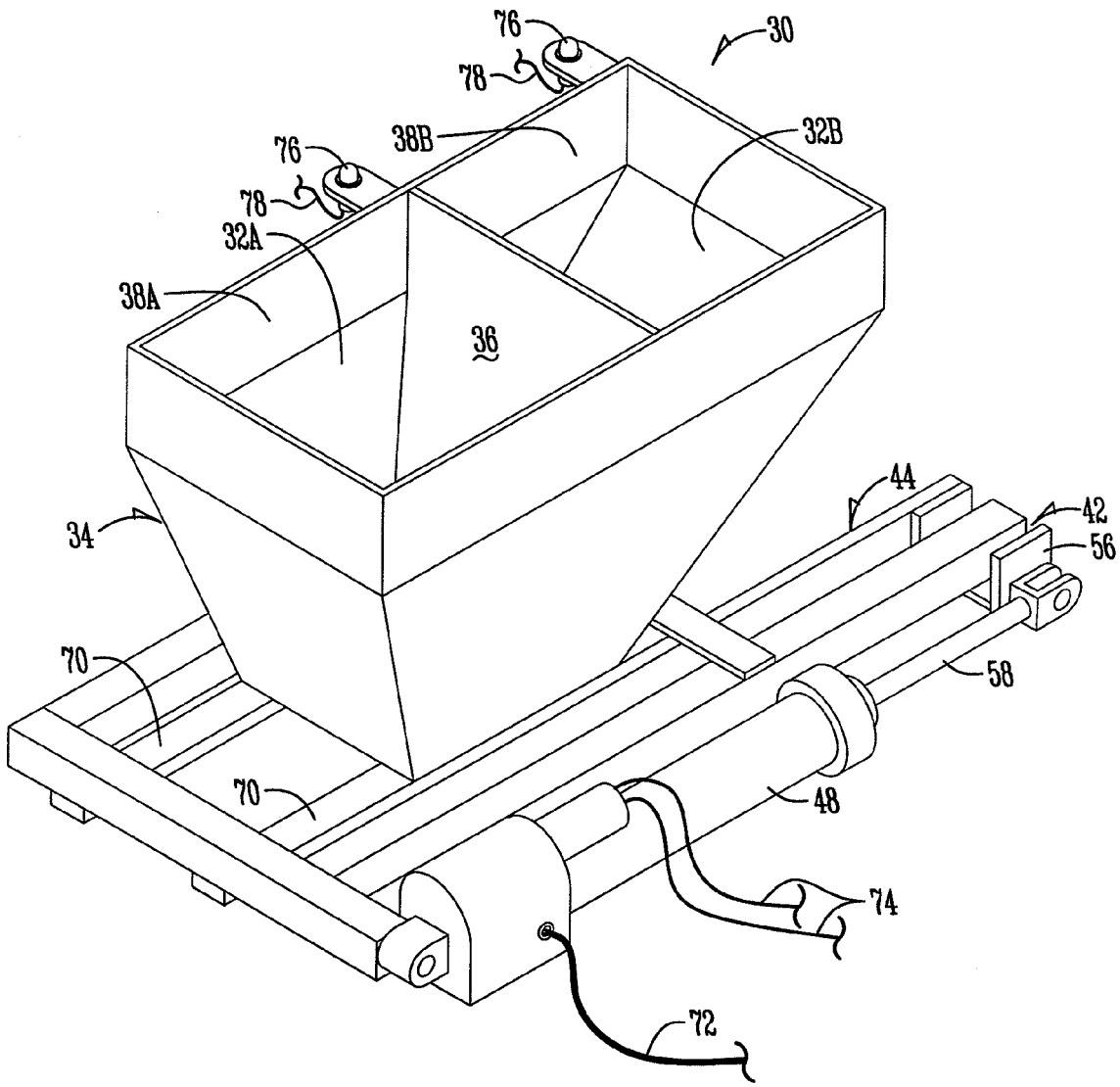
FIG. 3A is a perspective view of a staging unit according to one aspect of the present invention.

The staging unit 30 sitting atop seed metering unit 100 as best illustrated in FIGS. 2 and 3A provides a means for housing, separating and quickly transitioning similar or dissimilar seed batch types in a controlled manner into seed metering unit 100. In one aspect of the present invention, staging unit 30 includes generally a hopper 34. The hopper 34 includes one or more separated spaces 32A and 32B for housing similar or dissimilar seed batch types in separation from each other. The separation provided between the one or more spaces 32A and 32B may be a barrier 36, such as a dividing wall or membrane. Walls forming the body of the hopper 34 may be generally vertical or tapered inward to focus the transition of seed to a common point. The taper of the walls is such that hopper 34 is self-cleaning (i.e., gravity is able to overcome both static and kinetic friction of a seed within the hopper 34). In the case where hopper 34 is a dual bin hopper, such as illustrated in the figures, a first separated space 32A and a second separated spaced 32B are provided. A first inlet 38A is provided to the first separated space 32A and a second inlet 38B is provided to the second separated space 32B. The hopper 34 includes one or more outlets whereby seed is dispensed into the seed metering unit 100. The hopper 34 is supported by a frame 44. The frame 44 may be secured to planting unit 16, such as where frame 44 is secured to frame 26 of planting unit 16. Frame 44 may also be secured to the seed metering unit 100. Supported by frame 44 is a transitioning device 42 operated by an actuator 48. Those skilled in the art can appreciate that hopper 34 may be positioned at various locations about the planter and/or secured to the mobile structure 12 at a position near the row unit 14 whereby the outlet of hopper 34 is in seed receiving communication with seed metering unit 100 via one or more conduits, such as a seed tube. Seed dispensed from hopper 34 situated closely adjacent to or remotely from the planting unit 16 could be communicated to seed metering unit 100 through seed tubes either pneumatically or by gravity.

Each separated space 32A and 32B associated with hopper 34 may include a light indicator 76 to instruct an operator when to introduce a next seed batch from one or more of the separated spaces into the seed metering unit 100. In short, the operator can rely on the light indicator 76 associated with each separated space 32A and 32B of hopper 34 as an indication that the seed metering unit 100 is empty of all seed and that it is appropriate to introduce the next batch of seed from one of the separated spaces 32A and 32B of hopper 34. Light indicator 76 includes control wire 78 in operable communication with control panel 80 (shown in FIG. 1). The present invention contemplates that the functionality and purpose of light indicator 76 may be embodied in other components or hardware adapted or configured to instruct the operator when to introduce the next batch of seed into the seed metering unit 100. For example, staging unit 30 could include a visual indicator, an audible indicator or a tactile indicator to instruct the operator when to introduce the next seed batch into the seed metering unit 100. Confirmation that each batch of seed has been entirely dispensed from the seed metering unit 100 is also important to allow the operator to know when to introduce the next seed batch into one or more of the separated spaces 32A and 32B associated with hopper 34.

Figure 3B:
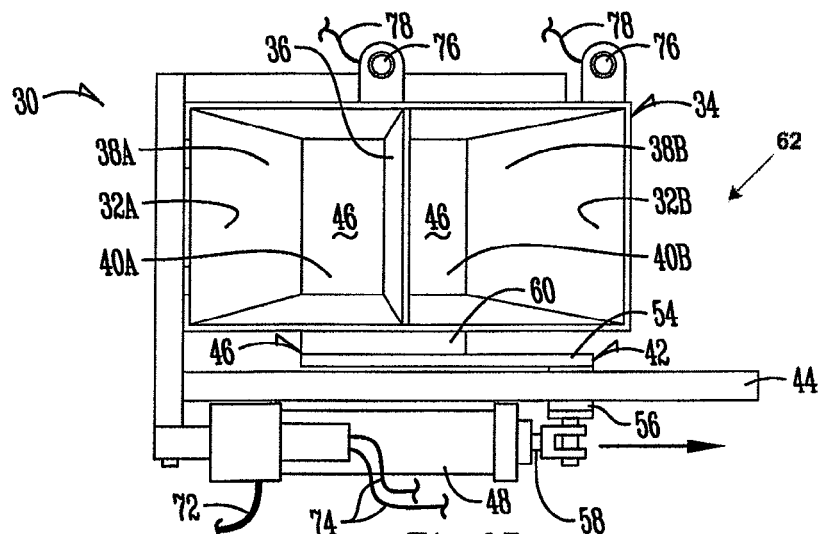
FIGS. 3B-D are plan views of the staging unit with the gate being actuated to one or more open positions according to one aspect of the present invention.
Figure 3C:
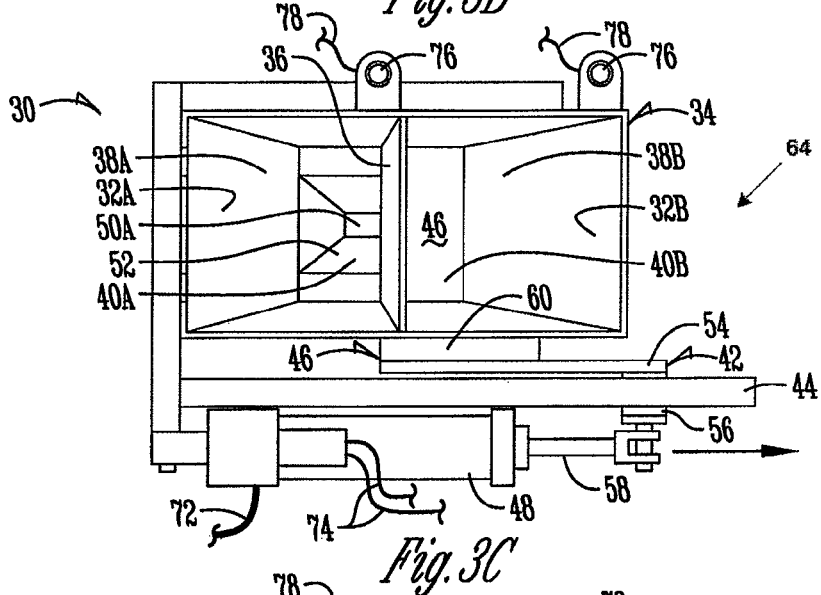
Figure 3D:
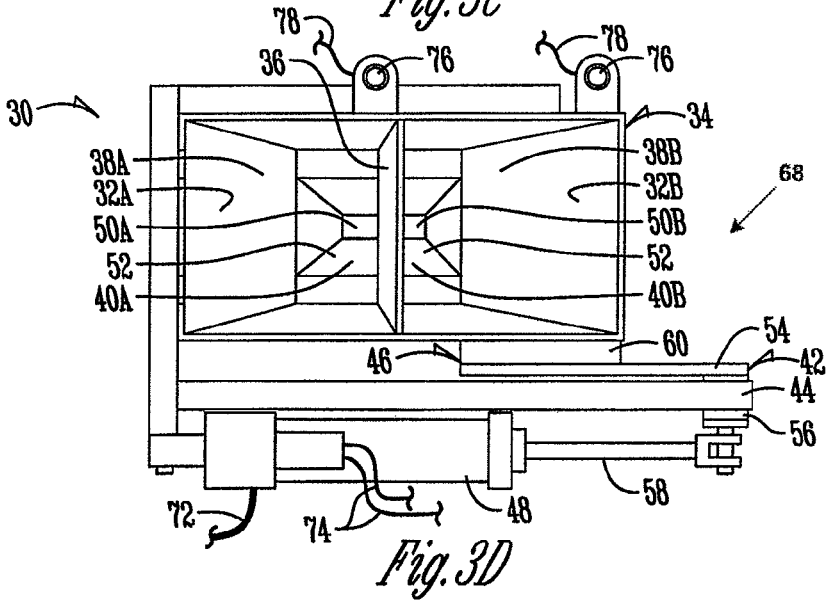

FIGS. 3B-3D best illustrate movement of transitioning device 42 via actuator 48. Actuator 48 is attached to frame 44 and includes a piston 58 operably attached to slide bracket 56. The piston 58 is moveable between a closed position 62 (see FIG. 3B), a first open position 64 (see FIG. 3C), and a second open position 68 (see FIG. 3D). The slide bracket 56 is attached to arm 54 which is secured to gate 46. Gate 46 includes a flat plate 60 supported by slide rail 70. Slide rail 70 supports movement of flat plate 60 between a closed position 62, a first open position 64 and a second open position 68. Plate 60 is preferably constructed of a metal or plastic material of minimal thickness, but sufficiently rigid to provide a closing functionality to first outlet 40A and second outlet 40B of hopper 34. Plate 60 may be configured to having the same opening/closing functionality of a gate similar to that of a clam shell, iris diaphragm, trap or self-centering gate/door. FIG. 3B illustrates gate 46 of transitioning device 42 in closed position 62. In closed position 62, slide plate 60 of gate 46 is in blocking position to first outlet 40A corresponding with first separated space 32A and second outlet 40B corresponding with second separated space 32B. In closed position 62, seed introduced into first separated space 32A and second separated space 32B through first inlet 38A and second inlet 32B is retained within first separated space 32A and second separated space 32B until actuation of gate 46 to either the first open position 64 shown in FIG. 3C or the second open position 68 shown in FIG. 3D. Actuator 48 may be mechanically, pneumatically, hydraulically, hydrostatically, or electronically controlled for transitioning gate 46 between positions. Actuator 48 may include a power supply 72 and one or more control wires 74 for operating actuator 48 and moving gate 46 between one or more actuated positions. Operating instructions communicated to actuator 48 control movement of gate 46 between actuated positions. The preferred embodiment of hopper 34, as described herein, is configured so that gate 46 may be actuated quickly between open and closed positions for either the first separated space 32A or second separated space 32B, which allows staging of multiple seed batches and quick transfer of either from the hopper 34 to the seed metering unit 100.

Figure 10:
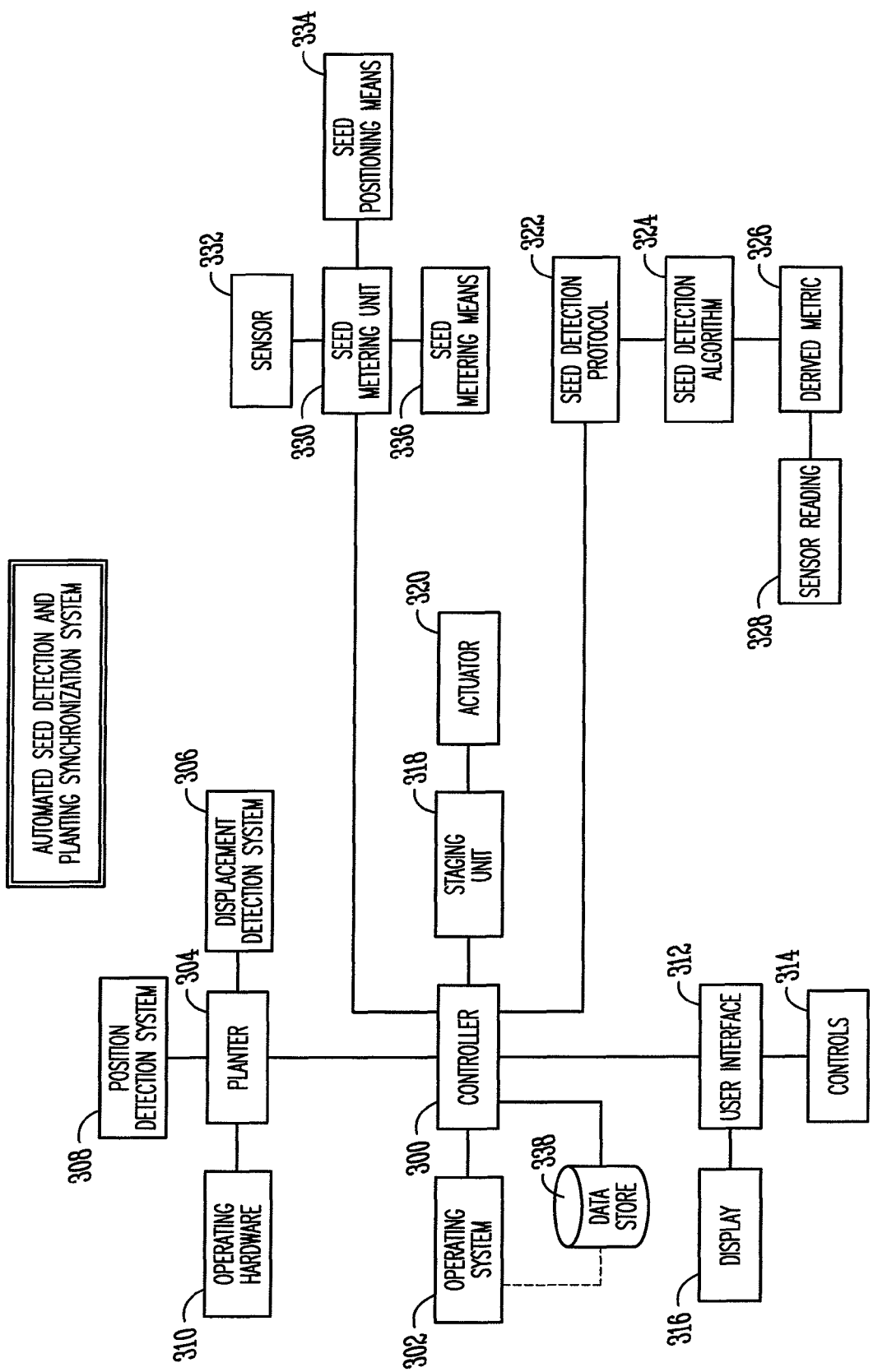
FIG. 10 is a flow diagram illustrating the automated seed detection and planting synchronization system according to one aspect of the present invention.

In FIG. 3C, piston 58 has been extended a distance to move slide bracket 56 in the direction of the arrow as illustrated. Movement of slide bracket 56, which is attached to gate 46 by arm 54, moves slide plate 60 in the direction of the illustrated arrow thereby opening first outlet 40A (i.e., in the first open position 64 slide plate 60 of gate 46 is no longer in blocking position to first outlet 40A). At the first outlet 40A of first separated space 32A is a chute 52 angled and positioned to be in communication with the inlet 102 of seed metering unit 100. As illustrated in FIG. 10, a controller, such as a programmable logic controller (PLC), may be used to monitor the position of gate 46 and calibrate the movement of gate 46 relative to first outlet 40A and second outlet 40B so as to not impede or interfere with the transition of seed from hopper 34 into seed metering unit 100. The controller may be used to provide instructions to actuator 48 to cause piston 58 to move gate 46 to an actuated position. The present invention contemplates that actuator 48 may be a linear actuator adapted for moving gate 46 between the various actuated positions. FIG. 3D illustrates gate 46 in the second open position 68. In the second open position 68, both first outlet 40A and second outlet 40B are open whereby objects within first separated space 32A and second separated space 32B are allowed to exit hopper 34 through opening 50A and opening 50B in chute 52 and into seed metering unit 100.

In FIG. 3D, piston 58 is fully extended from actuator 48 to move gate 46 out of blocking position of first outlet 40A and second outlet 40B corresponding with first separated space 32A and second separated space 32B respectively. Slide plate 60 of gate 46 is slidably supported by slide rails 70 attached to frame 44 in hopper 34. When gate 46 is in second open position 68, first inlet 38A and second inlet 38B are in open communication with opening 50A and opening 50B respectively. Actuator 48, upon receiving one or more instructions, may be moved back to first open position 64 or closed position 62 whereby either or both first outlet 40A and second outlet 40B are closed by slide plate 60. Chute 52 may include a barrier similar to barrier 36 whereby opening 50A and opening 50B are partitioned into separate openings for providing separated communication of seed through chute 52 into seed metering unit 100. Alternatively, chute 52 may provide a continuous opening (non-partitioned opening) whereby opening 50A may be in communication with second outlet 40B of second separated space 32B. Similarly, opening 50B may be in communication with first outlet 40A associated with first separated space 32A when gate 46 is in either the first open position 64 or second open position 68. A controller providing instructions to actuator 48 may be calibrated so that gate 46 is moved directly beneath or out of an obstructing pathway to both first outlet 40A and second outlet 40B of hopper 34.

Figure 4:
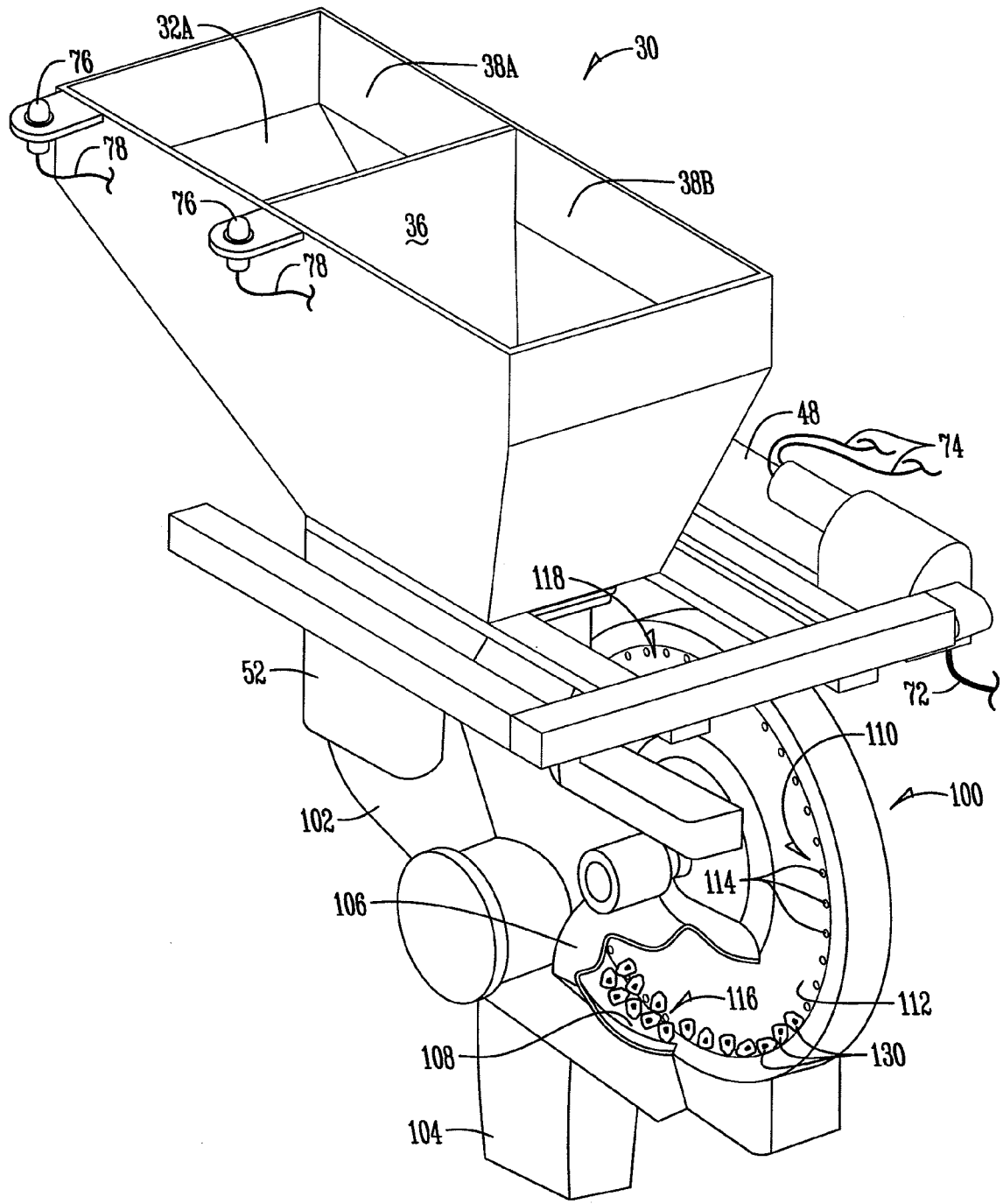
FIG. 4 is a perspective view of a staging and metering unit combination according to one aspect of the present invention.

FIG. 4 illustrates generally staging unit 30 and seed metering unit 100. Staging unit 30 sits preferably atop seed metering unit 100. First outlet 40A and second outlet 40B of staging unit 30 illustrated in FIGS. 3B-D are in communication with inlet 102 of seed metering unit 100 via chute 52. Metering unit 100 may be any type of metering unit capable of metering objects, such as seed, in a consistent, concise and singulated manner, these could include the pneumatic seed metering units disclosed in U.S. Pat. Nos. 5,325,801 and 5,501,366 or a JOHN DEERE VACU METER customarily used on the JOHN DEERE XP PRO SERIES row unit (see row units [online], [retrieved 2009 Jul. 21]. Retrieved from the Internet http://www.deere.com). A commercial seed metering unit 100, such as any one of the aforementioned units is capable of moving objects, such as seed, from a seed pick-up point 116 to a seed drop point 118 using one or more seed pick-ups 114 on seed disc 112. Capturing of a single seed 130 on each seed pick-up 114 may be performed pneumatically where the seed metering unit 100 operates using a vacuum plate for metering seed. In the case where the seed metering unit 100 uses a vacuum plate to pick-up seed 130 at the seed pick-up point 116 and release seed 130 at the seed drop point 118, vacuum is communicated to seed pick-ups 114 in seed disc 112 when seed pick-ups 114 are between the seed pick-up point 116 and seed drop point 118. Thus, a seed pick-up 114 has vacuum when the seed pick-up 114 rotates into the seed collection area 108 and continues having vacuum to hold seed 130 at each seed pick-up 114 until reaching the seed drop point 118 where the vacuum being communicated to each seed pick-up 114 is cut-off so the seed 130 is released from the seed pick-up 114 and dropped into the outlet 104 of seed metering unit 100.

Seed passing through outlet 104 of seed metering unit 100 is introduced into planting unit 16 for planting in the field. The seed metering unit 100 includes a seed hopper 106 where seed dispensed from staging unit 30 collects adjacent seed disc 112 for pick-up by a seed pick-up 114 on seed disc 112. General description for operation of a pneumatic seed metering unit is disclosed in one or more issued patents, including U.S. Pat. Nos. 5,325,801 and 5,501,366, the disclosures of which are incorporated herein by reference. Rotation of seed disc 112 may be provided by a motor or by geared linkage driven by forward movement of seed planter 10. In the case where seed disc 112 is rotated by a motor, the motor may be electrically, hydrostatically, or pneumatically driven. Means for instructing rotation and the rate of rotation of seed disc 112 could be provided by a controller. In the case where seed disc 112 is driven by gears or other mechanical linkage driven by movement of the planter, the gearing/linkage (e.g., variable speed control) may be configured to control the rate of rotation of the seed disc 112 relative to forward displacement of the planter 10.

Figure 5:
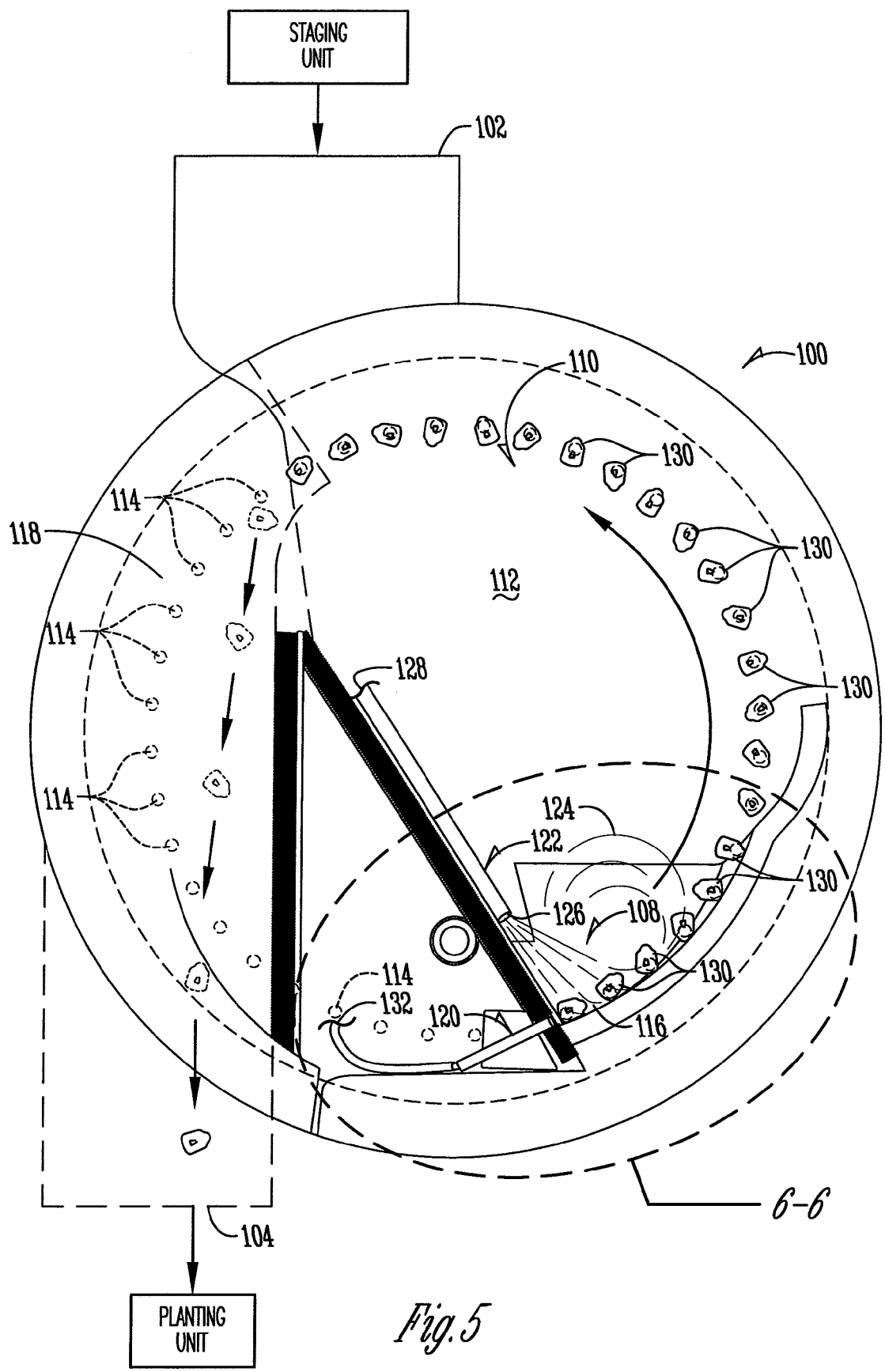
FIG. 5 is a side elevation view illustrating various internal components of the seed metering unit according to one aspect of the present invention.
Figure 6:
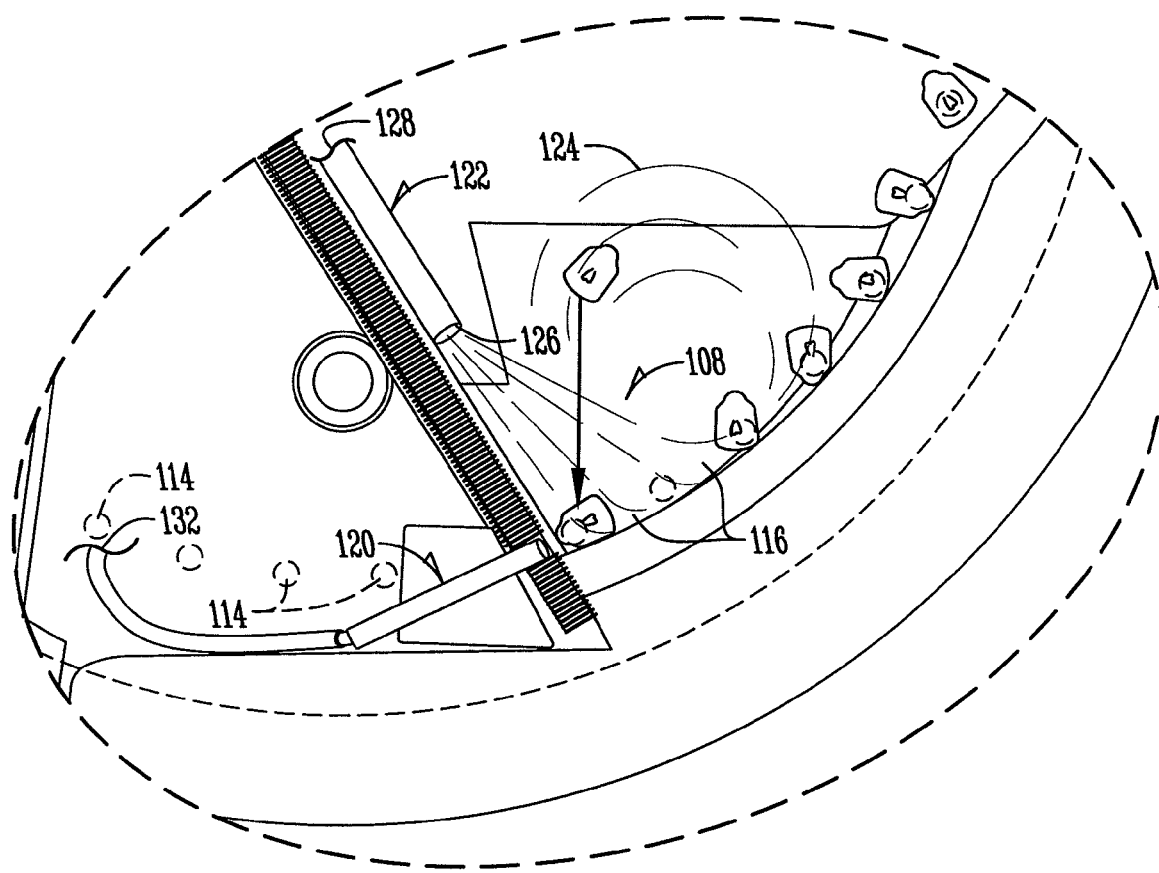
FIG. 6 is an illustration of the seed metering unit taken along line 6-6 in FIG. 5.

FIGS. 5 and 6 illustrate generally the internal components of seed metering unit 100. As previously discussed, seed metering unit 100 includes an inlet 102 in communication with staging unit 30. Objects such as seed being dispensed from staging unit 30 enter into seed metering unit 100 through inlet 102. Seed received within metering unit 100 is collected within a hopper 106 of seed metering unit 100 adjacent seed disc 112. In the case where seed metering means 110 is a pneumatic or vacuum plate, seed 130 is picked up by a seed pick-up 114 on seed disc 112. Generally, commercial embodiments of seed metering unit 100 are designed so that seed disc 112 picks up seed 130 at a seed pick-up point 116 and drops seed from seed disc 112 at a seed drop point 118. Seed dispensed into seed metering unit 100 from staging unit 30 collects at seed collection point 108 and remains there until picked-up by seed disc 112.

According to one aspect of the present invention, to ensure that all seed within hopper 106 are moved to the seed collection point 108 for pick-up by the seed disc 112, a seed positioning means 122 is placed within hopper 106 to encourage seed movement toward the seed collection point 108 or area. Seed positioning means or means for encouraging movement of seed to the seed collection point 108 is important in overcoming both static and kinetic friction between the seed and interior surfaces of the seed metering unit 100. For example, seed treatments may cause seed to become tacky and even sticky in humid environments. Thus, seed that might otherwise get hung-up in its transition to the seed collection point 108 is moved to the seed collection point 108 by seed positioning means 122. Seed positioning means 122 continually moves seed within the seed metering unit 100 to seed collection point 108 for metering to planting unit 16 thereby ensuring continuous planting of every seed from a seed batch without any skips resulting between each successive seed planting event. The seed collection point 108 or area is defined generally as the point/area at, around or adjacent the vicinity where seed within hopper 106 is picked-up by a seed pick-up 114 or seed disc 112. Seed positioning means 122 may include one or more types or forms of an agitator 124. For example, seed positioning means 122 may include a pneumatic agitator such as illustrated in FIGS. 5-6 where the pneumatic agitator includes a nozzle 126 for directing compressed air from a source 128 generally toward the seed collection point 108 or area for moving seed toward the seed collection point 108 for pick-up by the seed disc 112. Other seed positioning means 122 could include a vibrating agitator having a vibration field directed generally toward the seed collection point 108 for moving seed to the seed collection point for pick-up by the seed disc 112. Another seed positioning means 122 could include a mechanical armature having a moving component directed generally toward the seed collection point 108 or area for moving seed to the seed collection point 108 or area for pick-up by the seed disc 112. Other mechanical means for moving seed to the seed collection point 108 could include a continuous belt directed in its path of rotation toward the seed collection point 108. The pathway of influence of the seed positioning means 122 may be oriented so as to influence and encourage seed toward the seed collection point 108 without affecting seed having already been picked up by seed disc 112. For example, in the case where seed positioning means 122 is a pneumatic agitator 124 having a nozzle 126, the air stream from the compressed air source 128 may be jetted through nozzle 126 such that the pathway of influence of the air stream is sufficient to encourage seed toward the seed collection point 108 without disturbing the ordinary operation of seed metering unit 100. The magnitude of influence of seed positioning means 122 may be controlled by instructions from a controller and/or input from an operator. For example, in the case where seed positioning means 122 is a pneumatic agitator 124, an electric valve receiving instructions from a controller or controlled by manual control inputs may be incrementally opened or closed to control the pathway of influence of air exiting nozzle 126. Pneumatic agitator 124 could also be configured to operate under a continuous stream of compressed air passing through the nozzle into the seed collection area 108. Similarly, an electronic controller or manual control inputs may be used to control the magnitude of the field of influence of the vibration source in the case where seed positioning means 122 is a vibrating agitator. An electronic controller or manual control inputs may also be used to control movement of a mechanical armature for mechanically moving a component of the mechanical armature directed generally towards the seed collection point 108 for encouraging seed toward the seed collection point 108 for pick-up by seed disc 112. The electronic or manual control inputs provided to seed positioning means 122 could also be used to indicate to an operator the operational status or magnitude of influence of the seed positioning means 122.

In addition to seed positioning means 122 within hopper 106 of seed metering unit 100 and in accordance with another aspect of the present invention, a sensor 120 is configured at least partially within hopper 106 of seed metering unit 100 in communication with seed collection point 108 for detecting the absence or presence of seed 130 at seed collection point 108. Sensor 120 could be positioned within or at the outlet 104 of seed metering unit 100 to monitor seed being released to planting unit 16. Sensor 120 may include any type of sensor capable of detecting the presence or absence of seed 130. For example, sensor 120 could be a photoelectric sensor, an ultrasonic or radar type sensor, or another type of sensor capable of detecting seed presence or absence at seed collection point 108 in hopper 106 of seed metering unit 100. Sensor 120 is preferably in operable communication with a controller whereby readings from sensor 120 are taken and used to provide information and/or notifications to the operator, and/or used to control one or more operations of the invention. Signals or readings from sensor 120 processed by the controller could also be used in one or more seed detection protocols or algorithms for operating one or more aspects of the present invention (see FIGS. 8-10). Sensor 120 has a source 132 for providing some type of emittance energy for detecting the absence or presence of seed within hopper 106. For example, in the case where sensor 120 is a photoelectric sensor, energy in the form of light is received at sensor 120 from light source 132. One type of photoelectric sensor suitable for use in detecting the absence or presence of seed at the seed collection point 108 is a Contrinex LTK 1040 301 506, unthreaded body, 4 mm cylinder, 20 mm distance sensor (available through CONTRINEX INC., 2 Business Park Road, Old Saybrook, Conn. 06475). The functionality accomplished using sensor 120 is not limited to photo detecting seed absence or presence, but may be extended to the use of light, voltage, current change, signal change, polarity or dipole change to detect the presence or absence of seed at seed collection point 108.

As previously discussed, seed disc 112 may be rotated by gearing or linkage mechanically driven by movement of seed planter 10 through the field. For example, gearing or linkage tied into or driven/rotated by a shaft associated with displacement of the seed planter 10 may be used to rotate seed disc 112 in seed metering unit 100.

Although the present invention is discussed within the context of seed and metering of seed through seed metering unit 100, the present invention is not limited only to detecting when a seed metering unit 100 is empty so that subsequent seed batches may be introduced into the seed metering unit 100 without risk of carryover or contamination of seed plots within a field. Aspects of the invention have application to any scenario where a material or object is being metered to an outlet for being dispensed and where user or operator notification, or assurance is needed to discern when the metering unit is empty of the material or objects to prevent carryover or contamination of material or objects that have or are to be metered. For example, if granular material were dispensed by the metering means, the system of the present invention would provide an operator or an operating system with an instruction to introduce the next batch of material given the systems observation that the seed metering unit 100 is completely empty of granular materials. The next or another batch of granular material can then be introduced into the metering unit without risking carryover or cross contamination of the first batch of granular material. Further, separation between when one material batch and another material batch are dispensed could be controlled as the operator or dispensing system receives notification that the metering means is empty so that a next granular material batch may be introduced into the metering unit after the desired time separation/delay has occurred, which results in a desired spacing between batches. Another aspect of the present invention includes the ability to monitor seed or material levels within the seed metering unit 100. Thus, the system could be configured to alert or notify the operator when the seed or material level within the seed metering unit 100 is low.

Method

Figure 7:
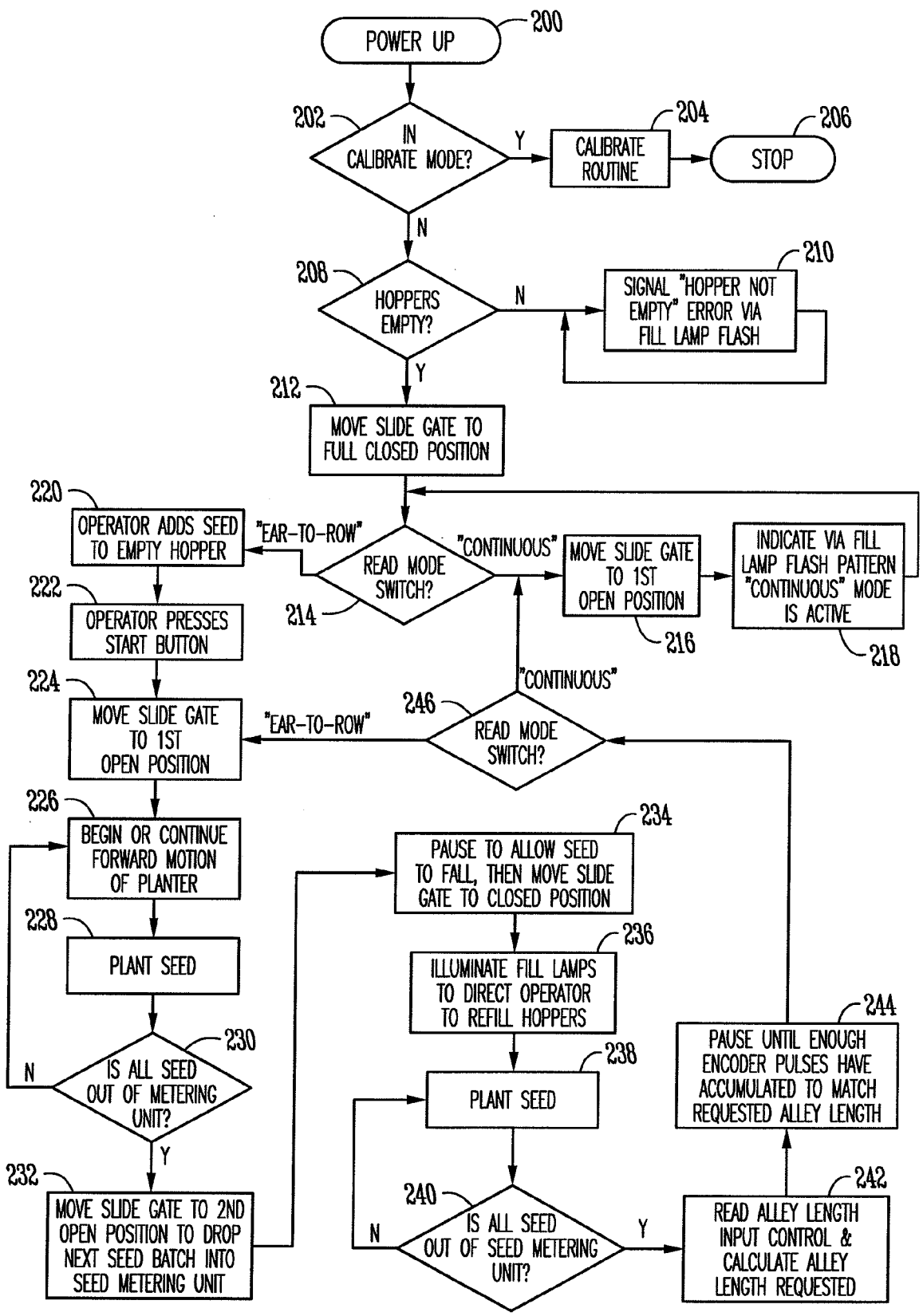
FIG. 7 is a flow diagram illustrating operation of one embodiment of the present invention.
Figure 8:
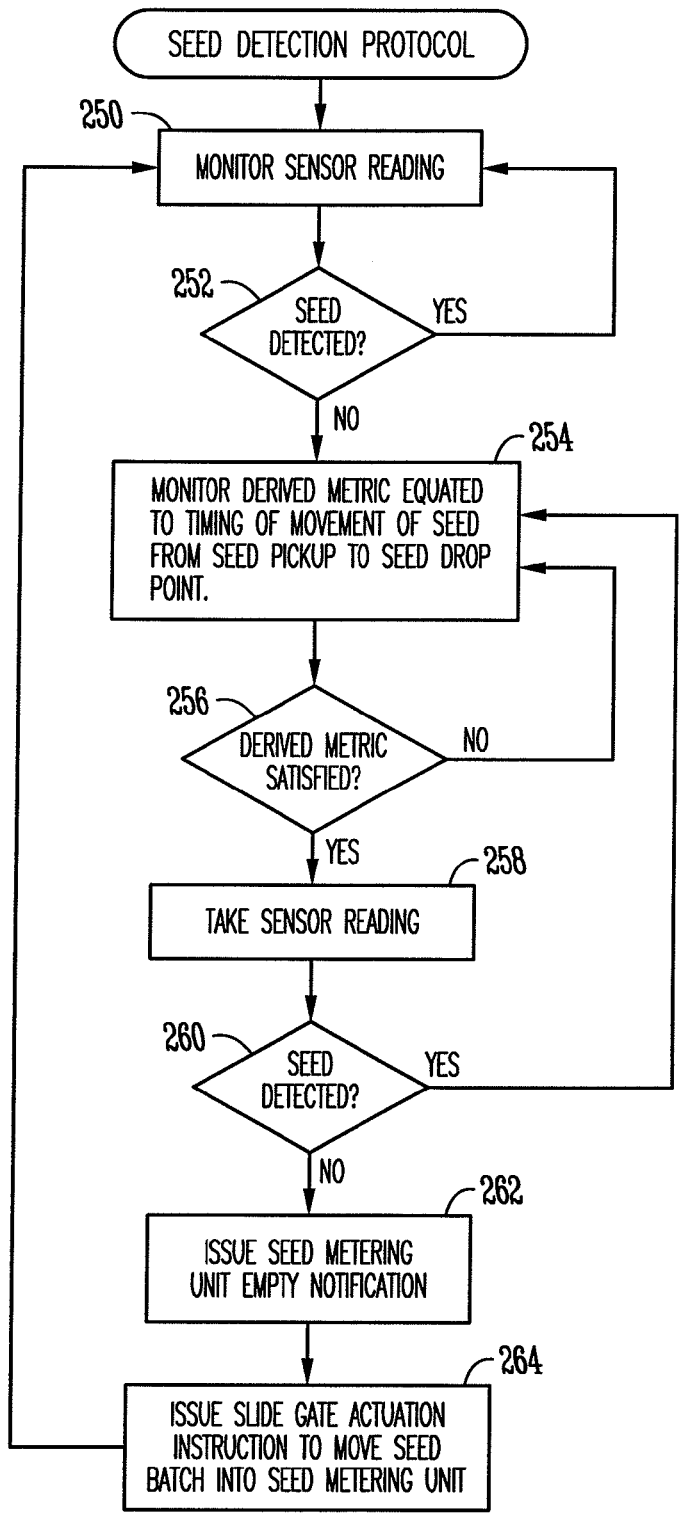
FIG. 8 is a flow diagram illustrating operation of a seed detection protocol according to one aspect of the present invention.
Figure 9:
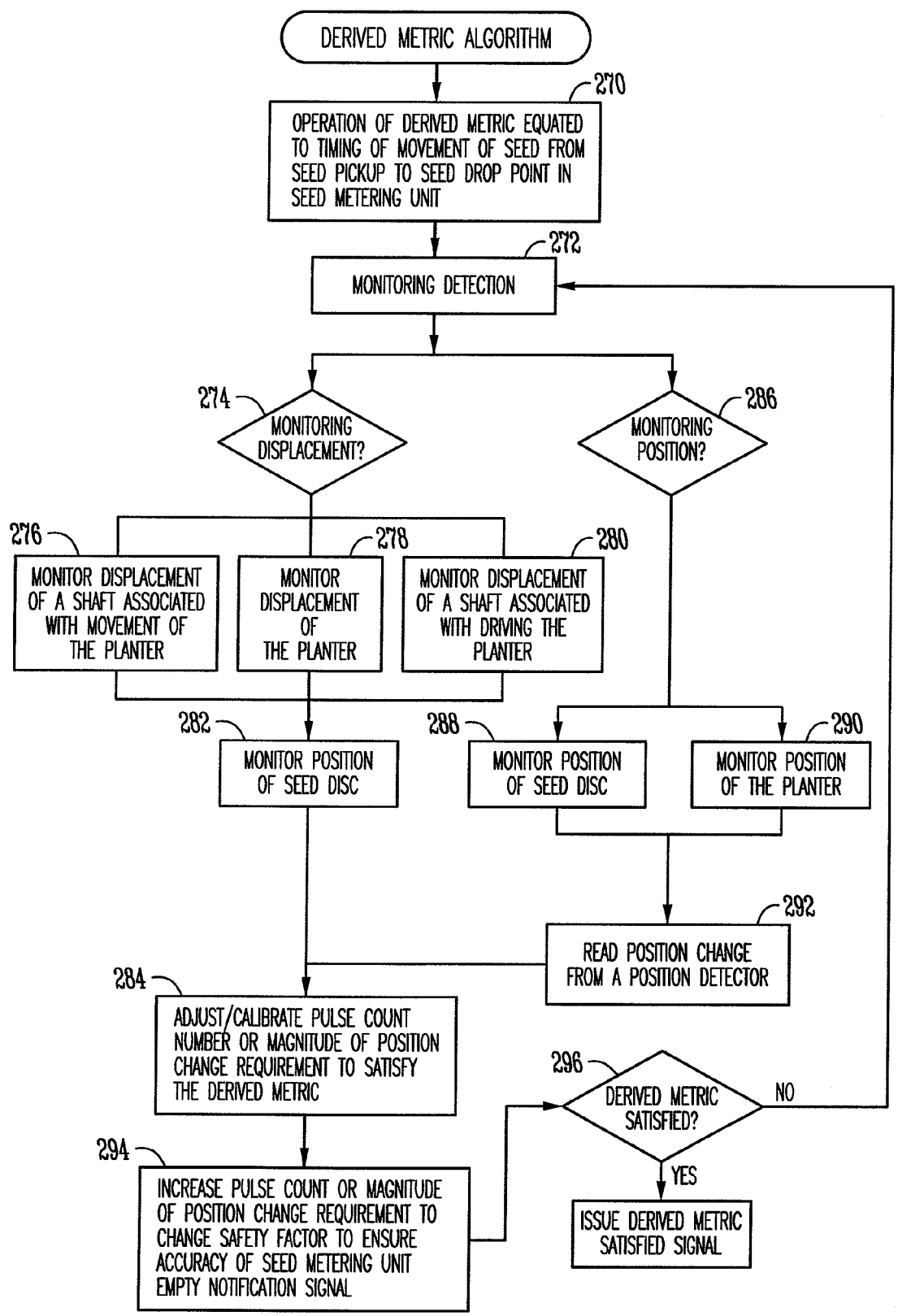
FIG. 9 is a flow diagram illustrating operation of a derived metric according to one aspect of the present invention.

FIGS. 7-9 illustrate various methods according to exemplary aspects of the present invention.

FIG. 7 illustrates a flow diagram for the seed detection and seed planting synchronization apparatus, method and system of the present invention. According to one aspect of the present invention, an operating system is provided which is in communication with a controller, such as a programmable logic controller (PLC). The control system is electronically powered. The controller is linked to each row unit 14 for controlling each row unit 14 independently or collectively. For example, one row unit may be operating under one operating protocol while another row unit is operating under a different operating protocol. Thus, the controller may be multiplexed to operate one or more row units simultaneously and in different operating modes if so desired.

The operating system for seed detection and planting synchronization undergoes an initial power up stage (step 200). Following power up, each row unit may be calibrated. For example, actuated operation of the slide gate 46 may be calibrated to ensure that slide gate 46 is blocking first outlet 40A associated with first separate space 32A and second outlet 42B associated with second separated space 32B when slide gate 46 is in the closed position 62. Calibration of actuator 48 for actuating slide gate 46 to the first open position 64 and/or the second open position 68 may be performed to ensure that in the first open position 64 opening 50A is in communication with first outlet 40A and in the second open position 68 opening 50B is in communication with second outlet 40B. In the calibration mode (step 202), the operating software performs a calibration routine (step 204). In another aspect of the present invention, calibration and operation of the slide gate 46 may be accomplished using air actuators and mechanical steps in combination with other mechanical elements to control stopping points for the slide gate 46.

The calibration algorithm or protocol includes capturing an electric voltage signal from the slide gate actuator based on position of the slide gate 46. For example, a voltage reading may be captured for each of the slide gates when in the closed position 62, the first open position 64, and/or the second open position 68. By manual visual inspection, the slide gates for each row unit may be verified as being in the desired closed position, first open position or second open position when the actuators receive instructions to move the slide gate 46 to one of the actuated positions. The target voltage representing the closed position, first open position and second open position for the slide gate are stored for example on a data store, and are retrievable by the controller for actuating each of the individual actuators for each row unit. If the seed planter 10 has four row units 14 and each slide gate has three positions, (closed position, first open position, and second open position) a total of 12 voltage recordings are stored within data store and retrievable by the controller for actuating each of the individual slide gates to the desired position whether closed 62, open to the first open position 64 or open to the second open position 68. Given that each row unit operates independent of the other and behaves differently, calibration allows the controller to account for variations in gate 46 movement to allow control of the slide gate with precision movement from and to the closed position, the open position and second open position.

Depending upon the desired seed planting protocol for each row unit 14, the controller may operate each planting unit independently or collectively. For example, one planting protocol may be used for operating the first and third row unit 14 while another planting protocol may be used to operate the second and fourth row unit 14 (in the case where the seed planter has four row units 14). Once the calibration routine (see step 204) is complete and stopped (see step 206), the controller exits the calibration mode and looks to verify whether or not each of the hoppers 106 of the seed metering unit 100 of each row unit are empty (i.e., no seed is present in the hopper 106). If sensor 120 within the seed metering unit 100 detects seed (i.e., the hopper is not empty) the operator is notified preferably by a lighted indicator signaling that the hopper is not empty (see step 210). Seed within hopper 106 may be purged or planted until the hopper not empty signal turns off. If the hopper 106 associated with each seed metering unit 100 is empty (see step 208) the controller instructs actuator 48 to move slide gate 46 to the closed position 62 (see step 212) (if the slide gate is not already in closed position 62).

Each row unit 14 is operable in a "continuous" planting mode or a "batch-to-row" planting mode. The "continuous" planting mode is to be understood to mean that the same seed batch types are being planted serially/sequentially, whereas the "batch-to-row" planting mode is to be understood to mean that different seed batch types are being planted serially/sequentially. Depending upon the desired planting protocol, the operator or controller moves the mode switch to "continuous" planting mode or "batch-to-row" planting mode (see step 214). If a continuous planting of the same seed batch type is desired, the mode switch is switched to "continuous" planting mode. Instructions for controlling the type of planting mode can be provided by an operator at a user interface or by a controller. In the "continuous" planting mode, slide gate 46 associated with each row unit 14 is moved to the first open position 64 (see step 216). In the first open position 64, the first separated space 32A of hopper 34 is now in communication with first outlet 40A and opening 50A. The operator may be notified that the system is now in "continuous" planting mode. The notification may be provided via a lamp or other visible display and/or audible source notifying the operator that the "continuous" planting mode is active (see step 218). With the slide gate 46 of each row unit 14 being moved to the first open position 64 seed may now be poured into the first separated space 32A through first inlet 38A. Seed poured into the first separated space 32A passes through first outlet 40A and opening 50A into the seed metering unit 100 through inlet 102 and collects within hopper 106 at seed collection point 108.

The seed planter 10 is then towed or navigated through the field and planting begins by seed metering means picking up seed 130 from seed collection point 108 and sequentially moving the seed from the seed pick-up point 116 to the seed drop point 118. The dispensed seed passes through the outlet 104 of seed metering unit 100 into planting unit 16 for planting within the field. The seed metering unit 100 continues to dispense seed for planting as the planter is towed or is navigated through the field. During planting, the controller continuously monitors the planting mode switch (step 214) to identify when a row unit 14 is switched from the "continuous" planting mode to the "batch-to-row" planting mode or vice versa. Alternative methods for the "continuous" planting mode are contemplated. For example, if the mode switch (step 214) is in the "continuous" planting mode, the operator could be instructed via a visible/audible notification (e.g., lamp, display or audible pattern) that the row unit is in "continuous" planting mode (see step 218). In the "continuous" planting mode the operator could fill both the first separate space 32A and the second separate space 32B of hopper 34 with the same seed batch types. The slide gate 46 could be actuated to the first open position 64 from the closed position 62 where the seed within the first separated space 32A is released into the seed metering unit for planting (if the seed metering unit empty notification signal is provided). If the planting protocol or algorithm requires a certain alley length or gap between plots of the same seed batch type, the slide gate 46 may be actuated from the first open position 64 to the second open position 68 when the operator is notified that the seed metering unit 100 is empty and the desired alley length has been met (i.e., the planter has moved a sufficient distance since the seed metering unit empty notification signal was given). For the purpose of the present application, "alley length" and "alley" are to be understood as the gap between plots. The alley could be planted with a different crop to provide separation or a buffer between plots.

If different seed batch types are to be planted using the same row unit 14 the operator or controller switches to the "batch-to-row" planting mode (see step 214). If the seed metering unit empty lamp is flashing indicating that the hopper 106 is empty, the operator may fill the first separated space 32A and second separated space 32B with separate seed batch types. For example, first separated space 32A may be filled with one seed batch type whereas second separated space 32B is filled with another seed batch type. To start the planting process, the operator/controller engages the start button (see step 222). After the start button is engaged, slide gate 46 moves from the closed position 62 to the first open position 64 (see step 224). If the planter 10 is not moving, forward motion of the planter is started (see step 226). The seed in first separated space 32A is released into the seed metering unit 100 upon actuation of slide gate 46 from the closed position 62 to the first open position 64. The second seed batch type remains in the second separated space 32B until slide gate 46 moves from the first open position 64 to the second open position 68. The first seed batch released into the seed metering unit 100 is planted as seed is picked up by the seed disc 112 and moved from seed pick-up point 116 to seed drop point 118 where each seed is released into the planting unit 16 for planting within the field. The seed disc 112 is rotated at the desired revolutions per minute (RPM) to achieve the desired seed spacing within the field.

As the seed planter 10 continues through the field, seed from the first seed batch within the seed metering unit 100 is sequentially dispensed into planting unit 16 for planting sequentially within the field. During planting of the first seed batch, the controller continuously monitors the seed metering unit 100 to detect when the seed metering unit is all out of seed (i.e., all of the seed from a batch dispensed into the metering unit has been dispensed to the planting unit 16). To determine if the entire batch of seed has been dispensed from the seed metering unit, the control system performs a seed detection algorithm or protocol, such as the seed detection protocol illustrated in FIG. 8. The seed detection protocol includes the step of monitoring a sensor reading (see step 250). As previously described, sensor 120 is positioned at least partially within hopper 106 of seed metering unit 100 and senses the presence or absence of seed at the seed collection point 108 or area. The operating system or controller continually monitors sensor 120 to identify if seed is detected (step 252). The operating system or controller continues to monitor sensor readings (step 250) until the sensor readings confirm the absence of seed within the seed metering unit 100 (i.e., no seed is detected). If no seed is detected, the controller or operating system monitors a derived metric equated to timing of movement of seed within the seed metering unit 100 from seed pick-up point 116 to seed drop point 118 (see step 254). In general terms, the controller or operating software identifies when the last seed has been picked up at the seed pick-up point 116 and if and when the last seed picked up at the seed pick-up point 116 is dropped off at the seed drop point 118 and ultimately communicated from the seed metering unit 100 into the planting unit 16 for planting within the field. In an alternative embodiment, sensor 120 could be positioned in the seed drop area, such as at the outlet 104 of seed metering unit 100, to monitor and report detection of a seed drop. Knowing the derived metric describing the time needed to move a seed from the pick-up point 116 to the seed drop point 118, and knowing at what point and when seeds are being released from the seed metering means 110 allows an operating system or controller to determine when to alert an operator that the seed metering unit 100 is empty, or issue an instruction to introduce another batch of seed into the seed metering unit 100.

The derived metric equated to timing of movement of seed from seed pick-up point 116 to seed drop point 118 and into seed planting unit 116 is further described and illustrated in FIG. 9. As shown in FIG. 9, the controller or operating system identifies one or more derived metrics from operation of the planter 10 to allow the controller or operating system to monitor, track and time the movement of a seed 130 from the seed pick-up point 116 to the seed drop point 118 within seed metering unit 100 (see step 270 in FIG. 9). To acquire and monitor a derived metric relating to operation of the seed planter 10, the controller or operating system monitors a detection system aboard the planter (see step 272). The detection system may be configured to monitor displacement (see step 274) or monitor position (see step 286). In the case where the step of monitoring detection for the seed planter (step 272) includes monitoring displacement (step 274), the controller or operating system may be configured to monitor displacement of a shaft associated with movement of the seed planter 10 (see step 276), monitor displacement of the planter 10 (see step 278), or monitor displacement of a shaft associated with driving the planter 10 (see step 280).

Because the rate of rotation of the seed disc 112 in the seed metering unit 100 is correlated to forward displacement of the planter 10, shafts associated with driving or movement of the planter 10 may be monitored as they too may be correlated with the rate of rotation of the seed disc 112 in the seed metering unit 100. For example, where the rate of rotation of the seed disc 112 is mechanically linked or correlated through one or more shafts with forward displacement of the planter, monitoring displacement (see step 274) of the mechanical linkage or shaft may be used to determine the rate of rotation for the seed disc 112 based upon forward movement of the planter 10. Knowing the rate of rotation for the seed disc 112, a calculation may be made to know when the last seed that was picked up by the seed disc 112 is dropped off at the seed drop point 118. The controller or operating system knows when the last seed is picked-up by the seed disc 112 because the sensor reading confirms the absence of seed at the seed collection point 116 or area. In summary, the controller or operating system identifies when the last seed has been picked up by the seed disc 112 and moved from the seed pick-up point 116 to the seed drop point 118 and when the last seed actually drops into the seed planting unit 16 rather than back into the seed collection point 108 or somewhere else within the hopper 106 of seed metering unit 100. To approximate displacement based on a shaft associated with movement or driving the planter or displacement of the planter, the controller or operating system may be configured to read or monitor pulse counts from an encoder (see step 282). For example, rotation of a jackshaft associated with forward movement of the planter (e.g., rotation of an axle) may be monitored using an encoder to approximate displacement of the planter and the desired rate of rotation for the seed disc 112.

The present invention contemplates other means for reading or acquiring displacement of a shaft associated with movement of the planter, driving the planter or even displacement of the planter itself. For example, the present invention contemplates the use of acquiring and analyzing a light reading, a voltage change, a current change, a signal change, or a polarity or dipole change to capture displacement of a shaft associated with movement or driving the planter, or displacement of the planter itself. Using this protocol, the operating system or controller is able to determine the necessary displacement of the planter or displacement of a shaft associated with driving or movement of the planter to know when a seed pick-up 114 in seed disc 112 has moved the last seed from the seed pick-up point 116 to the seed drop point 118.

The controller or operating system may be configured to adjust and calibrate the number of pulse counts needed from the encoder to satisfy the derived metric of the seed detection protocol (see step 284). This means that the controller or operating system has calculated a derived metric (i.e., the requisite displacement of a shaft associated with driving or movement of the planter, or displacement of the planter itself) that equates to movement of a seed on the seed disc 112 from the seed pick-up point 116 to the seed drop point 118. The controller or operating system may be configured to increment the pulse count requirement to change a safety factor associated with the derived metric to ensure accuracy of a seed metering unit emptying notification signal that is provided to the operator or used by the controller or operating system to control the staging unit 30 and the subsequent introduction of the next batch of seed into the seed metering unit 100. If the controller or operating system knows that it only needs "X" pulse counts to be assured that the seed has moved from the seed pick-up point 116 to the seed drop point 118, the operator may adjust the pulse count number requirement by adding a safety factor to the number of pulse counts. For example, if the system or controller knows that 30 pulse counts are required for the last seed to move from the seed pick-up point 116 to the seed drop point 118, the operator or controller may be configured to add a safety factor of several pulse counts to the already 30 pulse count requirement to ensure that the last seed on the seed disc has moved well past the seed drop point 118 so that a false reading is not perpetuated through the system to provide a false seed metering unit empty notification to the user.

The controller or operating system may also be configured to monitor position (see step 286) to formulate a derived metric associated with movement of a seed on the seed disc 112 from the seed pick-up point 116 to the seed drop point 118. For example, the controller or operating system may be configured to monitor position of the seed disc 112 (see step 288) or monitor position of the planter (see step 290). A position change of the seed disc or the planter may be monitored using any one of the aforementioned means for acquiring position or displacement change (see step 292). A geospatial recognition device is another means for acquiring position or displacement change of planter 10. The reading acquired from monitoring position change of seed disc 112 or planter 10 may be adjusted or calibrated, such as where the required position change is adjusted or calibrated to make sure that the derived metric is satisfied without interjecting a false reading or perpetuating a false signal through the system that ends up providing a seed metering unit empty notification to the user in error. To add a safety factor to make sure that the derived metric has actually been satisfied, the operating system or controller may be configured such that the safety factor is incrementally adjusted to ensure accuracy of the seed metering unit empty notification signal provided to the controller or the operating system for not prematurely actuating staging unit 30 or instructing an operator to introduce the next seed batch into the seed metering unit 100.

Understanding that the controller or operating system acquires a derived metric equated to timing of movement of seed from a seed pick-up to seed drop point, the controller or operating system continuously monitors the derived metric to identify when it has been satisfied (see step 256 in FIG. 8). If the derived metric is not satisfied the controller or operating system continues to monitor its status to determine when the derived metric has been satisfied. In one embodiment, the controller or operating system monitors when the requisite number of pulse counts have been obtained which indicates that the last seed has been moved from the seed pick-up point 116 to the seed drop point 118 for communication to the planting unit 16 for planting in the field. If the derived metric has been satisfied the controller or operating system takes a sensor reading (step 258). The sensor reading looks to verify that no seed remain within the seed metering unit 100. Seed positioning means 122 in the seed metering unit 100 urges seed within the hopper 106 toward the seed collection point 108 or area for detection by the sensor 120. If seed is not detected (see step 260) within the seed metering unit 100, the controller or operating system monitors for when the derived metric equated to timing of movement of the last seed from the seed pick-up 116 to the seed drop point 118 is satisfied. If the derived metric has been satisfied and the sensor takes another reading and confirms the absence of seed within the seed metering unit 100, the controller or operating system issues a seed metering unit empty notification signal either by sound or by visually apprising the operator via a lamp or display (see step 262) that the seed metering unit 100 is empty (i.e., there are no more seed within the seed metering unit 100).

The present system preferably has some redundancy built into the seed detection protocol to make sure that when the seed metering unit empty notification signal is given that it is not given in error whereby the staging unit would open and release another batch of seed into the seed metering unit causing carryover contamination of the seed plot. One example of the redundancy built into the seed detection protocol for providing accurate seed metering unit empty notification signals is as follows. If the last seed within the seed metering unit 100 is picked up at the seed pick-up point 116 and carried to the seed drop point 118, but before making it to the seed drop point 118 accidentally is released or dropped from the seed pick-up 114 on seed disc 112 and falls back down into the hopper 106, the operating system or controller is configured to account for this. In this scenario, the last seed when picked up and moved from the seed collection point 108 or area would trigger a no seed detected reading. The no seed detected reading by the sensor 120 would only be used to actuate the staging unit 30 to move another batch of seed in the seed metering unit 100 if the derived metric for timing movement of a seed from the seed pick-up point 116 to the seed drop point 118 is satisfied and the sensor 120 still confirms the absence of seed within the seed metering unit 100. Therefore, in the example where a seed accidentally drops from the seed disc 112 before making it to the seed drop point 118, and even though the derived metric is satisfied, the sensor 120 detects the fallen seed within the hopper 106 whereby the controller or operating system refrains from actuating the staging unit 32 to move another seed batch from the staging unit 30 into the seed metering unit 100 and/or refrains from instructing the operator to introduce the next seed batch into the seed metering unit 100. Thus, before instructing the operator or actuating the staging unit 30, the operating system or controller verifies that two things have positively occurred; namely, that the sensor 120 readings confirm the absence of seed 130 in the seed metering unit 100 and the derived metric for timing of movement of a seed 130 from the seed pick-up point 116 to seed drop point 118 has also been satisfied.

The controller or operating system may also be configured to incorporate a lag time between when the derived metric is deemed satisfied and when the sensor 120 no longer senses a seed 130 within the seed metering unit 100 to make sure that the seed has actually been dropped off into the planting unit 16 and not accidentally released back into the hopper 106 of the seed metering unit 100. With the seed detection protocol having confirmed that there is no longer seed within the seed metering unit and the derived metric being satisfied, the slide gate may now be actuated by the controller or by the operator whereby the next batch of seed is introduced into the seed metering unit 100 (see step 264) for planting.

As further described in FIG. 7, the controller or operating system having confirmed that all of the seed is out of the seed metering unit (see step 230) actuates slide gate 46 to second open position 68 to drop the next seed batch into the seed metering unit 100 (see step 232). Prior to actuating slide gate 46 to closed position 62, the controller or operating system pauses to allow all of the seed to dispense from the second separated space 32B into the seed metering unit 100. After a pause, the controller or operating system actuates the slide gate 46 to closed position 62 (see step 234). The controller or operating system then provides an audible or visual cue such as illuminating a lamp to instruct the operator to refill the first separated space 32A and second separated space 32B of the hopper 34 with a new seed batch (see step 236). The seed batch that was moved from the second separated space 32B into the seed metering unit 100 is sequentially metered from the seed metering unit 100 into the planting unit 16 for planting within the field (see step 238). The seed detection protocol as illustrated and shown in FIGS. 8-9 monitors the seed metering unit to determine if all of the seed has been dispensed from the seed metering unit (see step 240). Once the sensor readings confirm the absence of seed in the seed metering unit and confirm that the derived metric for timing of movement of seed from the seed pick-up to the seed drop point has been satisfied, the controller or operating system reads the alley length input control to determine how long to wait while the planter is travelling through the field before actuating the staging unit 30 or instruct the operator to release or introduce another new seed batch into the seed metering unit 100 for planting. In one embodiment, the controller or operating system calculates the requested alley length (see step 242) and waits until the requisite number of encoder pulses have been accumulated to match the requested alley length (see step 244). Thus, after the last seed has been dispensed from the seed metering unit and planted in the field, the controller or operating system monitors the distance the planter 10 travels by monitoring the number of encoder pulses to make sure that the requested alley length has been satisfied (see step 244) before actuating the staging unit 30 to release another new seed batch into the seed metering unit 100 for planting. The controller or operating system also continuously monitors the mode switch relating to whether the planter or row units are operating in a "continuous" planting mode or a "batch-to-row" planting mode. After reading the mode switch (step 246) the planter operates as previously described.

System

FIG. 10 illustrates an exemplary system for automated seed detection and planting synchronization. In one embodiment, the system includes a controller 300, such as a programmable logic controller (PLC). The controller 300 may be configured to operate in concert with an operating system 302. Skilled artisans will recognize the various types of operating systems suitable for use in conjunction with controller 300 for operating the automated seed detection and planting synchronization system of the present invention. Controller 300 may also be linked or in operable communication with a data store 338. A data store 338 may also be linked to operating system 302 and/or controller 300.

In another embodiment, of the present invention, controller 300 may be used to control various aspects of planter 304. As previously described and set forth above, planter 304 includes one or more position and/or forward displacement detection systems for computing the derived metric associated with timing of movement of the seed from the seed pick-up point to the seed drop point in the seed metering unit. The controller 300 may be linked either serially or via wireless connection to one or more displacement detection systems, such as a position detection system 308 or displacement detection system 306. In one aspect, position detection system 308 may be configured to monitor forward displacement of the planter 10 for controlling rotational movement of seed disc 112. The position detection system 308 could include a geospatial position detection system for monitoring forward displacement of the planter during planting for controlling rotation of seed disc 112. Alternatively, displacement detection system 306 may be configured to monitor displacement or rotation of a shaft associated with forward movement or driving of planter 10 through the field. Conventional operating hardware 310 associated with planter 304 may be operated by controller 300. For example, lift assist wheel assembly 28 may be operated using controller 300. Any other operating hardware associated with the planter 10 may also be controlled using controller 300.

In another aspect of the invention, a user interface 312 may be configured serially or via wireless communication with controller 300 whereby instructions from an operator are received for providing control inputs to controller 300. The user interface 312 may include one or more controls 314 for an operator to provide inputs to controller 300. User interface 312 may include other displays 316 for apprising the operator of the operational status of controller 300 or other systems aboard planter 10. The display 316 associated with user interface 312 may include one or more user notifications such as an audible, visible, or tactile notification system. In another aspect of the present invention, controller 300 is serially or wirelessly configured to control staging unit 308. Via automated or by operator control, instructions are provided from controller 300 to staging unit 318 for controlling actuator 320 whereby seed stored within staging unit is communicated from the staging unit into the seed metering unit. The status of the actuator 320 whether in the closed position, first open position, or second open position may be communicated back to the controller and provided at display 316 for notification to the operator.

In another aspect of the automated seed detection and planting synchronization system, controller 300 is serially or wirelessly linked with seed detection protocol 322. The seed detection protocol 322 may be configured to operate aboard operating system 302 or via a seed detection algorithm 324 using controller 300. The seed detection algorithm 324 as set forth in FIGS. 8-9, uses the combination of a sensor reading 328 being received and a derived metric 326 being satisfied to confirm absence of seed in the seed metering unit 100 to allow the staging unit to be actuated to the next position whereby seed is transferred from the staging unit into the seed metering unit. The status of the seed detection protocol 322 may be communicated back to controller 300 and made available to the operator via display 316. For example, display 316 may include an indicator such as a fill lamp that lights up when the seed protection protocol 322 instructs the operator to fill the staging unit 318 with another new batch of seed. The display may also include a lamp that instructs the operator when to actuate the staging unit to allow the seed batch to be dispensed into the seed metering unit.

In another aspect of the automated seed detection and planting synchronization system, seed metering unit 330 may be in linked communication with controller 300, either wirelessly or serially. The seed metering unit 330 controls movement of seed from the seed metering unit into the planting unit for planting in the field. Within the seed metering unit 330 is a sensor 332. The status of sensor 332 is monitored via controller 300 and displayed to the user. For example, when sensor 332 detects seed within the seed metering unit 330, the display 316 notifies the operator via a lamp or other signal notification system that there is seed still within the seed metering unit 330. Alternatively, when sensor 332 no longer detects seed in the seed metering unit 330, the signal is communicated back to controller 300 for apprising the operator via display 316 that seed is no longer detected in the seed metering unit 330. The controller 300 may also be used to calibrate or notify the operator when sensor 332 needs to be serviced or recalibrated. Included within the seed metering unit 330 is a seed positioning means 334. Whether by instruction from the operator system or an operator, controller 300 may be configured to control seed positioning means 334 within seed metering unit 330. For example, seed positioning means 334 may be calibrated by the operator using controller 300. The status of seed positioning means 334 may be made available to the operator using display 316. Operational errors of seed positioning means 334 may also be communicated to the operator through display 316 using controller 300. Operation, calibration, monitorization of seed metering means 336 may also be accomplished using controller 300 in combination with display 316. Various aspects of the automated seed detection and planting synchronization system have been disclosed and are contemplated in FIG. 10 as illustrated.

The exemplary embodiments of the present invention have been set forth within the drawings and in the foregoing description and although specific terms are employed, these terms are used in the generically descriptive sense only and are not used for the purpose of limitation. Changes in the formed proportion of parts as well as in the substitution of equivalents are contemplated as circumstances may suggest or are rendered expedient without departing from the spirit and scope of the present invention further defined in the following claims.

What is claimed is:

1. A seed planter adapted for detecting when a seed metering unit is empty, the planter comprising:
   a mobile structure having a seed staging, metering and planting unit; the seed metering unit comprising:
   a. seed metering means;
   b. a seed pick-up and drop point; and
   c. a sensor for detecting seed at the seed pick-up point;
   a seed detection protocol comprising:
   a. a derived metric equated to timing of movement of a seed carried by seed metering means from the seed pick-up to seed drop point, and
   b. wherein a seed metering unit empty notification is provided if:
      i. sensor readings confirm the absence of seed in the seed metering unit; and
      ii. the derived metric is satisfied.

2. The seed planter of claim 1 wherein the seed metering unit further comprises a hopper having a seed collection point proximate the seed pick-up point, the sensor being positioned at the seed collection point for detecting seed.

3. The seed planter of claim 2 wherein the seed metering unit further comprises a seed positioning system, wherein said seed positioning system comprises:
   a. seed positioning means having a seed moving influence directed generally toward the seed collection point;
   b. said seed positioning means to assist in moving seed toward the seed collection point for pick up by the seed metering means; and
   c. said seed positioning means providing continuous planting of an entire batch of seed without skips.

4. The seed planter of claim 3 wherein said seed positioning means comprises:
   a. a pneumatic agitator having a pathway of influence directed generally toward the seed collection point for moving seed to the seed collection point;
   b. a vibrating agitator for encouraging movement of seed to the seed collection point; or
   c. a mechanical armature having a moving component directed generally toward the seed collection point for moving seed to the seed collection point.

5. The seed planter of claim 1 wherein the seed staging unit comprises at least two separated spaces for staging batches of seed in isolation from the other.

6. The seed planter of claim 5 further comprising a seed transitioning device between the seed staging and metering unit, the seed transitioning device having an open position corresponding with each of the separated spaces in the seed staging unit.

7. The seed planter of claim 6 further comprising a controller providing an instruction to said seed transitioning device to actuate to said open position upon receipt of said seed metering unit empty notification.

8. The seed planter of claim 1 wherein the derived metric comprises:
   a. displacement of a shaft associated with movement of the mobile structure;
   b. displacement or travel of the mobile structure;
   c. displacement of a shaft associated with driving said seed metering means;
   d. position monitoring of said seed metering means; or
   e. position monitoring of said mobile structure.

9. The seed planter of claim 8 wherein displacement is captured by:
   a. a light reading;
   b. a voltage change;
   c. a current change;
   d. a signal change;
   e. a resistance change; or
   f. a polarity or dipole change.

10. The seed planter of claim 8 wherein displacement of said shaft is calculated by reading an output of a position sensor.

11. The seed planter of claim 10 wherein displacement required for satisfying the derived metric is adjustable to provide a safety factor to thereby ensure accuracy of the seed metering unit empty notification.

12. A seed detection and planting synchronization system for detecting when a seed metering unit is empty, the seed detection system comprising:
   a seed metering unit comprising:
   a. seed metering means;
   b. a seed pick-up and drop point; and
   c. an agitator having a path of influence directed generally toward a seed collection point contiguous with said seed pick-up point, the agitator adapted to encourage seed movement toward said seed collection point for pick up by said seed metering means;
   a seed detection protocol comprising:
   a. a derived metric equated to movement of a seed carried by seed metering means from the seed pick-up to seed drop point, and
   b. wherein a seed metering unit empty notification is provided if:
      i. sensor readings confirm the absence of seed in the seed metering unit; and
      ii. the derived metric is satisfied.

13. The system of claim 12 wherein the seed metering unit further comprises a seed detection sensor positioned contiguous with the seed collection point for detecting when the seed collection point is empty of seed.

14. The system of claim 12 wherein the seed metering means comprises:
   a. a vacuum plate seed meter;
   b. a finger pickup seed meter;
   c. a brush-type seed meter;
   d. a plate-type seed meter; or
   e. a belt-type seed meter.

15. The system of claim 12 wherein the agitator comprises:
   a. a pneumatic agitator providing airstreams for cooperating with said vacuum assisted seed plate for moving seed into said seed collection point;

b. a vibrating agitator for moving seed into said seed collection point; or c. a mechanical armature for moving seed into said seed collection point.

16. The system of claim 12 in combination with a seed planter.

17. A seed planter configurable between planting the same or different seed batch types and preventing carryover between different seed batches types, the seed planter comprising:

a seed batch dispensing detection protocol for a seed metering unit comprising:
  a. a derived metric equated to movement of a seed carried by a seed metering means from a seed pick-up point to a seed drop point in communication with a seed planting unit; and
  b. wherein a seed metering unit empty notification is provided if:
    i. sensor readings confirm the absence of seed in the seed metering unit; and
    ii. the derived metric is satisfied;
a seed staging unit comprising separated spaces for staging batches of seed;
a seed transitioning device having an open position corresponding with each separated space; and
wherein the seed transitioning device moves to one of said open positions when the seed metering unit empty notification is provided.

18. The seed planter of claim 17 further comprising:
a. a first seed dispensing protocol for dispensing same seed batch types; or
b. a second seed dispensing protocol for dispensing different seed batch types.

19. The seed planter of claim 18 wherein the first seed dispensing protocol comprises:
a. said seed transitioning device being actuated to an open position associated with at least one separated space in the seed staging unit; and
b. consecutive same seed batch types being introduced into at least one separated space in the staging unit for continuous planting of the same seed type.

20. The seed planter of claim 18 wherein the second seed dispensing protocol comprises:
a. different seed batch types being separated into said separated spaces in the staging unit;
b. said seed transitioning device being actuated to a first open position associated with a first separated space in the staging unit upon receipt of said seed metering unit empty notification; and
c. said seed transitioning device being actuated to a second open position associated with a second separated space in the staging unit upon receipt of said seed metering unit empty notification.

21. The seed planter of claim 17 wherein the seed metering unit further comprises a seed positioning system, wherein said seed positioning system comprises:
a. seed positioning means directed generally toward the seed pick-up point; and
b. said seed positioning means to assist in moving seed toward the seed pick-up point for pick up by the seed metering means.

22. A method for a seed planter for preventing seed carryover during the planting of different seed batch types, the method comprising:

providing a seed planter comprising a seed staging, metering and planting unit, wherein the seed metering unit comprises seed metering means having a seed pick-up point and drop point, the seed drop point in communication with the seed planting unit;
monitoring a derived metric equated to timing of movement of a seed carried from the seed pick-up point to the seed drop point;
issuing a seed metering unit empty signal if:
  a. sensor readings confirm the absence of seed in the seed metering unit; and
  b. the derived metric is satisfied;
moving a next seed batch from the seed staging unit to the seed metering unit upon receipt of said seed metering unit empty signal.

23. The method of claim 22 further comprising encouraging movement of seed in the seed metering unit to a seed collection point contiguous with said seed pick-up point by:
a. channeling airstreams directed toward the seed collection point for encouraging movement of seed toward said seed collection point;
b. introducing vibrations at the seed collection point for encouraging movement of seed toward said seed collection point; or
c. moving a mechanical armature toward the seed collection point for encouraging movement of seed toward said seed collection point.

24. The method of claim 22 wherein monitoring the derived metric step comprises detecting displacement or change in position of the seed planter or seed metering means by:
a. monitoring a light reading;
b. monitoring a voltage reading;
c. monitoring a capacitance change;
d. monitoring a signal change;
e. monitoring a resistance change; or
f. monitoring a polarity or dipole change.

25. The method of claim 24 wherein said detecting step comprises monitoring displacement of said seed planter or seed metering unit by reading an output of a displacement detection system.

26. The method of claim 25 further comprising adjusting said output of said displacement detection system for the derived metric to be satisfied for providing a safety factor for ensuring accuracy of the seed metering unit empty signal.

27. The method of claim 22 further comprising a seed dispensing protocol comprising:
a. a first seed dispensing protocol for dispensing same seed batch types; or
b. a second seed dispensing protocol for dispensing different seed batch types.

28. The method of claim 27 wherein the first seed dispensing protocol comprises:
a. actuating a seed transitioning device to an open position associated with at least one seed staging location in the seed staging unit; and
b. introducing consecutive same seed batch types into the at least one seed staging location in the seed staging unit for continuous planting of the same seed type.

29. The method of claim 27 wherein the second seed dispensing protocol comprises:
a. storing different seed batch types in separated seed staging locations in the staging unit;
b. actuating a seed transitioning device to a first open position associated with a first seed staging location for transitioning one seed batch type into the seed metering unit for planting;
c. dispensing seed from said seed metering unit for planting; and d. actuating said seed transitioning device to a second open position associated with a second seed staging location upon receipt of said seed metering unit empty signal for transitioning another seed batch type into the seed metering unit for planting.

30. A method for synchronizing planting by automatically detecting when a batch of seed has been completely dispensed from a seed metering unit, the method comprising:
   providing a seed detection protocol for detecting when the seed metering unit is empty, the seed detection protocol comprising:
   a. monitoring a derived metric equated to movement of a seed carried from a seed pick-up point to a seed drop point in the seed metering unit;
   b. agitating seed in the seed metering unit for encouraging movement of seed to a seed collection point contiguous with the seed pick-up point;
   c. taking seed sensor readings at the seed collection point; and
   d. generating a seed metering unit empty signal if:
      i. seed sensor readings confirm the absence of seed at the seed collection point; and
      ii. the derived metric is satisfied.

31. The method of claim 30 wherein monitoring the derived metric comprises:
   a. monitoring movement of a seed from the seed pick-up point to the seed drop point;
   b. monitoring driving means providing movement of a seed from the seed pick-up point to the seed drop point; or
   c. monitoring displacement associated with movement of said seed metering unit.

32. The method of claim 30 in combination with a seed planter.

33. The method of claim 32 further comprising planting same seed batch types with said seed planter by:
   a. actuating a seed transitioning device to an open position associated with at least one seed staging location in the seed staging unit; and
   b. introducing consecutive same seed batch types into the at least one seed staging location in the seed staging unit for continuous planting of the same seed type.

34. The method of claim 32 further comprising planting different seed batch types with said seed planter by:
   a. staging different seed batch types in separated staging locations in a staging unit;
   b. actuating a seed transitioning device to a first open position associated with a first seed staging location for transitioning one seed batch type into the seed metering unit for planting;
   c. dispensing seed from the seed metering unit for planting; and
   d. actuating said seed transitioning device to a second open position associated with a second seed staging location upon receipt of said seed metering unit empty signal for transitioning another seed batch type into the seed metering unit for planting.

35. The method of claim 32 wherein monitoring the derived metric comprises:
   a. monitoring displacement of a shaft associated with forward displacement of the seed planter;
   b. monitoring displacement associated movement of the seed planter;
   c. monitoring position of said seed planter; or
   d. monitoring position of one or more components moving commensurate with movement of said seed planter.

36. The method of claim 30 wherein said agitating step comprises:
   a. channeling airstreams directed toward the seed collection point for encouraging movement of seed toward said seed collection point;
   b. introducing vibrations at the seed collection point for encouraging movement of seed toward said seed collection point; or
   c. moving a mechanical armature toward the seed collection point for encouraging movement of seed toward said seed collection point.

* * * * *